United States Patent
Kocobas et al.

(10) Patent No.: US 12,157,287 B2
(45) Date of Patent: Dec. 3, 2024

(54) VARIABLE EMISSIVITY SURFACES

(71) Applicant: The University of Manchester, Manchester (GB)

(72) Inventors: Coskun Kocobas, Manchester (GB); Gokhan Bakan, Manchester (GB); Muhammed Said Ergoktas, Manchester (GB)

(73) Assignee: The University of Manchester, Manchester (GB)

(*) Notice: Subject to any disclaimer, the term of this patent is extended or adjusted under 35 U.S.C. 154(b) by 283 days.

(21) Appl. No.: 17/904,745

(22) PCT Filed: Feb. 25, 2021

(86) PCT No.: PCT/GB2021/050488
§ 371 (c)(1),
(2) Date: Aug. 22, 2022

(87) PCT Pub. No.: WO2021/171027
PCT Pub. Date: Sep. 2, 2021

(65) Prior Publication Data
US 2023/0017078 A1    Jan. 19, 2023

(30) Foreign Application Priority Data
Feb. 25, 2020    (GB) .................................. 2002657

(51) Int. Cl.
| | | |
|---|---|---|
| *B32B 15/18* | (2006.01) | |
| *B32B 7/14* | (2006.01) | |
| *B32B 9/00* | (2006.01) | |
| *B32B 9/04* | (2006.01) | |
| *B32B 15/02* | (2006.01) | |
| *B32B 15/14* | (2006.01) | |
| *B32B 27/16* | (2006.01) | |
| *B32B 27/32* | (2006.01) | |

(52) U.S. Cl.
CPC .............. *B32B 15/18* (2013.01); *B32B 7/14* (2013.01); *B32B 9/007* (2013.01); *B32B 9/045* (2013.01); *B32B 9/047* (2013.01); *B32B 15/02* (2013.01); *B32B 15/14* (2013.01); *B32B 27/16* (2013.01); *B32B 27/32* (2013.01); *B32B 2260/021* (2013.01); *B32B 2307/202* (2013.01); *B32B 2457/00* (2013.01)

(58) Field of Classification Search
None
See application file for complete search history.

(56) References Cited

FOREIGN PATENT DOCUMENTS

CN    110013133 A    7/2019

OTHER PUBLICATIONS

Currano-et-al—Performance-analysis-of-an-electrostatic-switched-radiator-using-heat-flux-based-emissivity—2008 (Year: 2008).*
Zhang—US 2008-0170982 A1—nanofiber ribbons for ionic liquids or electrolytes—2008 (Year: 2008).*

(Continued)

*Primary Examiner* — John Vincent Lawler
(74) *Attorney, Agent, or Firm* — Hamilton, Brook, Smith & Reynolds, P.C.

(57) ABSTRACT

This invention relates to devices integrally comprising fibres that have emissivities, particularly of infrared radiation, that can be controllably varied. The active emissive surface comprises graphene layers with intercalated ions.

21 Claims, 17 Drawing Sheets

(56) References Cited

OTHER PUBLICATIONS

Salihoglu-et-al—graphene-based-adaptive-thermal-camouflage—Nano Letters—2018 (Year: 2018).*
Zhao—Tunable infrared emissivity w-graphene+ionic liquid—Nanomaterials—Jul. 31, 2019 (Year: 2019).*
Sun-et-al—mid-infrared-radiation-modulator-with-multilayer-graphene-thin-film-by-ionic-liquid-gating—ACS Appl. Mat. &Interfaces—Mar. 21, 2019 (Year: 2019).*
Zhao Li Yuan et al: 11 Tunable Infrared Emissivity in Multi layer Graphene by Ionic Liquid Intercalation , Nanomaterials, vol. 9, No. 8, Jul. 31, 2019 (Jul. 31, 2019).
Sun Yue et al: "Flexible Mid-Infrared Radiation Modulator with Multilayer Graphene Thin Film by Ionic Liquid Gating", Applied Materials & Interfaces, vo 1 • 11, No. 14, Apr. 10, 2019 (Apr. 10, 2019), pp. 13538-13544.
Omer Salihoglu et al: "Graphene Based Adaptive Thermal Camouflage", arxiv.org, Cornell University Library, 201 Olin Library Cornell University Ithaca, NY 14853, Apr. 30, 2018 (Apr. 30, 2018).
International Search Report for International Application No. PCT/GB2021/050488, "Variable Emissivity Surfaces", date of completion: Jun. 3, 2021.
Written Opinion for International Application No. PCT/GB2021/050488, "Variable Emissivity Surfaces", date of completion: Jun. 3, 2021.

* cited by examiner

VARIABLE EMISSIVITY SURFACES

This application is the U.S. National Stage of International Application No. PCT/GB2021/050488, filed Feb. 25, 2021, which designates the U.S., published in English, and claims priority under 35 U.S.C. § 119 or 365(c) to Great Britain Application No. 2002657.1, filed Feb. 25, 2020. The entire teachings of the above applications are incorporated herein by reference.

This invention relates to devices integrally comprising fibres that have emissivities, particularly of infrared radiation, that can be controllably varied. The active emissive surface comprises graphene layers with intercalated ions.

BACKGROUND

The ability to control the infrared emissivity of a surface finds application in many different contexts. If you can control the infrared emissivity of a surface, you can control the rate at which it emits heat and this can help to minimise heat loss. It also finds potential use in the field of wearable technologies.

Kocabas et al (Graphene-Based Adaptive Thermal Camouflage, Nano Lett. 2018, 18, 4541-4548) have described the use of graphene layers as a controllable emitters of thermal radiation. The devices comprise a porous polyethylene membrane, an ionic liquid and a plurality of atomic layers of graphene.

BRIEF SUMMARY OF THE DISCLOSURE

In a first aspect of the present invention there is provided a device for controlling the emissivity of a surface, the device comprising:
- an active layer comprising from 5 to 500 atomic layers of graphene, said active layer having a first surface and a second surface;
- a substrate that comprises fibres and, absorbed into the fibres of the substrate, an ionic liquid or liquid electrolyte, said substrate having a first surface and a second surface; wherein said second surface of the active layer is in contact with the first surface of the substrate;
- a conductor that is in contact with the second surface of the substrate; and
- a means for applying a controllably variable electrical potential between the conductor and the active layer.

In a second aspect of the present invention, there is provided a method of varying the emissivity of the first surface of the active layer of the device of the first aspect, the method comprising varying the electrical potential that is applied between the conductive layer and the active layer.

When a voltage is applied between the conductive layer and the active layer, ions from the ionic liquid/liquid electrolyte intercalate between the graphene layers of the active layer. At 0 V, multilayer graphene has high infrared absorption which leads to high emissivity. When a sufficient voltage difference is applied (>2.5 V), the intercalation of the ions from the ionic liquid into the graphene layers enhances the optical conductivity of the graphene and suppresses the emissivity. The fibre substrate thus serves not only as a mechanical support, but also as an electrical separator, and ionic medium.

In a third aspect of the present invention, there is provided a method of making a device of the first aspect of the invention, the method comprising steps of: (i) affixing the second surface of the active layer with the first surface of the substrate; (ii) affixing the conductor to the second surface of the substrate; and (iii) diffusing ionic liquid or liquid electrolyte into the substrate.

The device of the first aspect may be suitable for carrying out the method of the second aspect.

The device of the first aspect may be obtainable from the method of the third aspect.

The invention also provides a garment or covering comprising the device of the first aspect.

Device

The device may further comprise a protective layer, in contact with the first surface of the active layer. The protective layer is typically transparent to infra-red radiation. The protective layer may allow greater than 50% transmittance of infra-red radiation (e.g. radiation having a wavelength in the range 8 to 13 µm). The protective layer may allow greater than 70% (e.g. greater than 80%) transmittance of infra-red radiation (e.g. radiation having a wavelength in the range 8 to 13 µm). The protective layer is preferably flexible. The protective layer may be polyethylene. The protective layer may be low density polyethylene. The protective layer may have a thickness in the range 1 µm to 100 µm. The protective layer may have a thickness in the range 5 µm to 50 µm. The protective layer may have a thickness in the range 8 µm to 30 µm. The protective layer may have a thickness in the range 10 µm to 25 µm.

There may be adhesive means between the protective layer and the active layer. This adhesive means will either be transparent to infra-red radiation or it will be patterned such that it covers 50% or less (e.g. 10% or less) of the first surface of the active layer. Alternatively, the protective layer may have been treated in such a way as to increase the adhesion between the protective layer and the active layer. The protective layer may have been treated with a plasma, e.g. an oxygen plasma, to increase the adhesion between the protective layer and the active layer.

The active layer comprises 5 to 500 atomic layers of graphene. The active layer may comprise 50 to 500 atomic layers of graphene. The active layer may comprise 100 to 200 atomic layers of graphene.

Typically, when the devices of the invention are produced, the atomic layers of graphene are bonded together as the atomic layers are in graphite. Where this is the case, typically the first time an electrical potential is applied, the ions (both anions and cations) of the ionic liquid/liquid electrolyte intercalate in between the graphene atomic layers, separating them and causing the interlayer bonding in the graphitic structure to cease. More of one set of ions (e.g. anions) intercalate than the other set of ions (e.g. cations) in this initial intercalation step and in any subsequent application of voltage. The identity of the ions that are greater will depend upon the direction of the potential applied. The inventors have observed peaks indicative of independent single layer and few layer thick graphene by x-ray diffraction (XRD) spectroscopy. It is believed that the graphitic bonding does not reform once the electrical potential is removed and at least some of the intercalated ions remain in between the graphene. When no voltage is applied, there are roughly the same amounts of positive and negative ions intercalated between the graphene layers. The excess ions (e.g. anions) are believed to have returned to the ionic liquid or liquid electrolyte, The graphene atomic layers may have a graphitic structure.

Alternatively, the atomic layers of graphene may be present in the form of a stack of independent single layer graphene flakes. The atomic layers of graphene may be present in the form of independent few-layer graphene flakes, e.g. graphene flakes that are 2 to 5 atomic layers thick. The atomic layers of graphene may be present in the form of a mixture of independent single layer and few-layer graphene flakes. Independent, in this context means that the bonding between the graphene flakes is non-graphitic. In these embodiments, ions from the ionic liquid/liquid electrolyte are typically intercalated between the graphene flakes.

The graphene is typically pristine graphene, e.g. graphene that is greater than 90 atomic % carbon, graphene that is greater than 95 atomic % carbon, or graphene that is greater than 99 atomic % carbon. The graphene may have a sheet resistance of 20 kΩ/sq or less, 10 kΩ/sq or less, 5 kΩ/sq or less, 1 kΩ/sq or less, 0.5 kΩ/sq or less, or 0.1 kΩ/sq or less. The graphene may be formed by chemical vapour deposition (CVD). CVD graphene is believed to be more effective than graphene obtained by other means.

The device may be a planar device. Thus, the conductor may form a conductive layer and the protective layer (if present), the active layer, the substrate and the conductive layer form a stack.

The materials of which the planar devices of the invention are made are typically flexible so although they may be formed of planar pieces of material, they may be folded, bent or rolled as desired.

The device may be a fibre. Thus, the conductor may form a conductive core and the substrate is a yarn wrapped around the conductive core. The active layer and the protective layer (if present) form concentric layers around the conductive core.

The material of which the substrate is made comprises fibres. As the skilled person would appreciate, the term 'fibre' typically refers to an elongate form of a material, e.g. a polymer.

In embodiments, the fibres have a thickness of from about 0.1 μm to about 100 μm. In preferred embodiments, the fibres have a thickness of from about 0.1 μm to about 10 μm.

It may be that each of fibres are separated from an adjacent fibre by an average distance of from about 1 μm to about 100 μm. It may be that each of fibres are separated from an adjacent fibre by a distance of from about 1 μm to about 50 μm. It may be that each of fibres are separated from an adjacent fibre by a distance of from about 1 μm to about 20 μm. A fibre spacing of less than 100 μm can be more effective at retaining the ionic liquid than substrates with larger fibre spacing.

Fibre thickness and spacing of a sample can be determined either using a calibrated optical microscope an electron microscope (SEM).

The substrate may be a woven material. The substrate may be a non-woven material. The substrate may be a textile. The substrate may be formed of a natural material, e.g. cotton, silk or wool. The substrate may be formed of a synthetic material, e.g. polyester, polyethylene, nylon.

The substrate may be selected from the group comprising: cotton, wool, silk, polyester, polyimide, nylon and elastane. The inventors have found that effective devices can be formed with substrates comprising all of these materials.

The substrate may be woven cotton. The substrate may be non-woven polyethylene, e.g. a non-woven high density polyethylene (e.g. that sold under the Tradename Tyvek®). In this context, the term 'non-woven' refers to a plurality of independent fibres associated with one another in a non-regular manner, i.e. that are not woven together.

The term 'textile' refers to a fabric material comprising an interwoven network of fibres.

There may be an adhesive means between the active layer and the substrate. This adhesive may be patterned such that it does not block ion transport between the substrate and the active layer. The adhesive may cover 50% or less (e.g. 10% or less) of the second surface of the active layer. Alternatively, the adhesive may cover up to 100% of the second surface of the active layer and be sufficiently porous to allow ion transport between the substrate and the active layer. In a preferred alternative, the substrate (e.g. the first surface of the substrate) may have been treated in such a way as to increase the adhesion between the substrate and the active layer. The substrate (e.g. the first surface of the substrate) may have been treated with a plasma, e.g. an oxygen plasma, to increase the adhesion between the substrate layer and the active layer.

The substrate layer may have a thickness in the range 1 μm to 5000 μm. The substrate layer may have a thickness in the range 1 μm to 1000 μm. The substrate may have a thickness in the range 1 μm to 500 μm. The substrate layer may have a thickness in the range 5 μm to 200 μm. The substrate layer may have a thickness in the range 10 μm to 100 μm. The substrate layer may have a thickness in the range 15 μm to 50 μm.

The ionic liquid or liquid electrolyte is absorbed into the substrate. The ionic liquid or liquid electrolyte may be absorbed into the fibres of the substrate and/or in may be situated in the spaces in between the fibres of the substrate.

Preferably, the substrate comprises an ionic liquid.

The ionic liquid will preferably be selected such that it is a liquid at the temperatures the device is expected to operate at. The ionic liquid may have a melting point in the range from −196° C. to 200° C. The ionic liquid may have a melting point greater than −30° C. The ionic liquid may have a melting point greater than 0° C. The ionic liquid will preferably be selected such that it is stable at the voltages that the device operates at.

The ionic liquid will preferably be selected such that it absorbs into the substrate. The ionic liquid may comprise an organic cation. The anion may be organic. Alternatively, the anion may be inorganic. Examples of organic cations include: imidazolium, pyridinium, pyrrolidinium, phosphonium, ammonium, and sulfonium. Specific examples of organic cations include: methyltrioctylammonium, cholin, 1-allyl-3-methyl-imidazolium, 1-butyl-2,3-dimethyl-imidazolium, 1-butyl-3-methyl-imidazolium, 1,2-dimethyl-3-propyl-imidazolium, 1,3-dimethyl-imidazolium, 1-ethyl-3-methyl-imidazolium, 1-hexadecyl-3-methyl-imidazolium, 1-hexyl-3-methyl-imidazolium, 1-methyl-3-octyl-imidazolium, 1-methyl-3-propyl-imidazolium, trihexyltetradecyl-phosphonium, 1-methyl-1-propyl piperidinium, 1-butyl-pyridinium, 1-butyl-3-methyl-pyridinium, 1-butyl-4-methyl-pyridinium, 1-butyl-1-methyl-pyrrolidinium, 1-methyl-1-propyl-pyrrolidinium and triethyl-sulfonium. Examples of anions include: alkylsulfate (e.g. ethyl sulfate, methanesulfonate, trifluoromethylsulfonate), dialkylphosphate (e.g. dimethyl phosphate, diethylphosphatre), tosylate, dichloroacetic acid. acetate bis(trifluoromethylsulfonyl)imide, hexafluorophosphate, tetrafluoroborate, tetrachloroaluminate, and halide (e.g. chloride, bromide, iodide), dicyanamide, dihydrogen phosphate, hydrogensulfate, nitrate and thiocyanate.

The ionic liquid may be selected from: [DEME][TFSI] (Diethylmethyl(2-methoxyethyl)ammonium bis(trifluoromethylsulfonyl)imide), 1,3-dimethylimidazolium methyl-phosphonate, 1-(4-sulfobutyl)-3-methylimidazolium bis(trifluoromethanesulfonyl)imide, 1-(4-sulfobutyl)-3-methylimidazolium hydrogen sulfate, 1-(4-sulfobutyl)-3- methylimidazolium trifluoromethanesulfonate 1-Butyl-1-Methylpyrrolidinium bis(oxalate)borate, 1-Butyl-1-Methylpyrrolidinium Dicyanamide, 1-Butyl-1-methylpyrrolidinium trifluoromethanesulfonate, 1-Butyl-3-methylimidazolium iodide, 1-Ethyl-3-Methylimidazolium Dicyanamide, 1-Ethyl-3-methylimidazolium diethyl phosphate, 1-Ethyl-3-methylimidazolium methyl-phosphonate, 1-Ethyl-3-methylimidazolium trifluoromethanesulfonate, 1-Ethyl-3-methylimidazolium trifluoromethanesulfonate, 1-Hexyl-3-methylimidazolium trifluoromethanesulfonate, 3-Methyl-1-propylimidazolium iodide, N-Tributyl-N-methylammonium iodide, N-Trimethyl-N-butylammonium bromide, BMIMPF$_6$ (1-Butyl-3-methylimidazolium hexafluorophosphate), (N,N-diethyl-N-methyl-N(2methoxyethyl)ammonium bis(fluorosulfonyl)imide, (N,N-diethyl-N-methyl-N(2methoxyethyl)ammonium bis(trifluoromethanesulfonyl)imide, 1-Allyl-3H-imidazolium bis(trifluoromethanesulfonyl)imide, 1-Butyl-1-methylpyrrolidinium bis(fluorosulfonyl)imide, 1-Butyl-1-methylpyrrolidinium bis(fluorosulfonyl)imide, 1-Butyl-1-methylpyrrolidinium bis(trifluoromethanesulfonyl)imide, 1-Butyl-1-methylpyrrolidinium bis(trifluoromethanesulfonyl)imide, 1-Butyl-3-methylimidazolium bis(trifluoromethanesulfonyl)imide, 1-Butyl-3-methylimidazolium bis(trifluoromethanesulfonyl)imide, 1-Ethyl-3-methylimidazolium bis(fluorosulfonyl)imide, 1-Ethyl-3-methylimidazolium bis(fluorosulfonyl)imide, 1-Ethyl-3-methylimidazolium bis(trifluoromethanesulfonyl)imide, 1-Ethyl-3-methylimidazolium bis(trifluoromethanesulfonyl)imide, 1-Ethyl-3-methylimidazolium bis(trifluoromethanesulfonyl)imide, 1-Hexyl-3-methylimidazolium bis(trifluoromethanesulfonyl)imide, 1-Hexyl-3-methylimidazolium bis(trifluoromethanesulfonyl)imide, 1-Methyl-1-(2-methoxyethyl)pyrrolidinium bis(fluorosulfonyl)imide, 1-Methyl-1-(2-methoxyethyl)pyrrolidinium bis(trifluoromethanesulfonyl)imide, 1-Methyl-1-(3-methoxypropyl)pyrrolidinium bis(fluorosulfonyl)imide, 1-Methyl-1-(3-methoxypropyl)pyrrolidinium bis(trifluoromethanesulfonyl)imide, 1-Methyl-1-octylpyrrolidinium bis(trifluoromethanesulfonyl)imide, 1-Methyl-1-octylpyrrolidinium bis(trifluoromethanesulfonyl)imide, 1-Methyl-1-pentylpyrrolidinium bis(trifluoromethanesulfonyl)imide, 1-Octyl-3-methylimidazolium bis(trifluoromethanesulfonyl)imide, H-3-methylimidazolium bis(trifluoromethanesulfonyl)imide, N,N-Diethyl-N-methyl-N-propylammonium bis(fluorosulfonyl)imide, N,N-Diethyl-N-methyl-N-propylammonium bis(fluorosulfonyl)imide, N,N-dimethyl-N-ethyl-N-(3-methoxypropyl)ammonium bis(fluorosulfonyl)imide, N,N-dimethyl-N-ethyl-N-(3-methoxypropyl)ammonium bis(trifluoromethanesulfonyl)imide, N,N-Dimethyl-N-ethyl-N-benzylAmmonium bis(trifluoromethanesulfonyl)imide, N,N-Dimethyl-N-Ethyl-N-Phenylethylammonium bis(trifluoromethanesulfonyl)imide, N-butyl-N-methylpiperidinium bis(trifluoromethanesulfonyl)imide, N-butyl-N-methylpiperidinium bis(trifluoromethanesulfonyl)imide, N-Ethyl-N,N-dimethyl-N-(2-methoxyethyl)ammonium bis(fluorosulfonyl)imide, N-Ethyl-N,N-dimethyl-N-(2-methoxyethyl)ammonium bis(trifluoromethanesulfonyl)imide, N-propyl-N-methylpiperidinium bis(fluorosulfonyl)imide, N-propyl-N-methylpiperidinium bis(fluorosulfonyl)imide, N-propyl-N-methylpiperidinium bis(trifluoromethanesulfonyl)imide, N-propyl-N-methylpiperidinium bis(trifluoromethanesulfonyl)imide, N-Propyl-N-methylpyrrolidinium bis(fluorosulfonyl)imide, N-Propyl-N-methylpyrrolidinium bis(fluorosulfonyl)imide, N-Propyl-N-methylpyrrolidinium bis(trifluoromethanesulfonyl)imide, N-Propyl-N-methylpyrrolidinium bis(trifluoromethanesulfonyl)imide, N-Tributyl-N-methylammonium bis(trifluoromethanesulfonyl)imide, N-Tributyl-N-methylammonium dicyanamide, N-Tributyl-N-methylammonium bis(trifluoromethanesulfonyl)imide, N-Trimethyl-N-butylammonium bis(fluorosulfonyl)imide, N-Trimethyl-N-butylammonium bis(fluorosulfonyl)imide, N-Trimethyl-N-butylammonium bis(trifluoromethanesulfonyl)imide, N-Trimethyl-N-butylammonium bis(trifluoromethanesulfonyl)imide, N-Trimethyl-N-hexylammonium bis(trifluoromethanesulfonyl)imide, N-Trimethyl-N-hexylammonium bis(trifluoromethanesulfonyl)imide, N-Trimethyl-N-propylammonium bis(fluorosulfonyl)imide, N-Trimethyl-N-propylammonium bis(fluorosulfonyl)imide, N-Trimethyl-N-propylammonium bis(trifluoromethanesulfonyl)imide, N-Trimethyl-N-propylammonium bis(trifluoromethanesulfonyl)imide and Trihexyl(tetradecyl)phosphonium chloride.

The ionic liquid may be a hydrophilic ionic liquid. Hydrophilic ionic liquids can be used with most substrates, including non-woven polyethylene. Examples of hydrophilic ionic liquids include: [DEME][TFSI] (Diethylmethyl(2-methoxyethyl)ammonium bis(trifluoromethylsulfonyl)imide), 1,3-dimethylimidazolium methyl-phosphonate, 1-(4-sulfobutyl)-3-methylimidazolium bis(trifluoromethanesulfonyl)imide, 1-(4-sulfobutyl)-3-methylimidazolium hydrogen sulfate, 1-(4-sulfobutyl)-3-methylimidazolium trifluoromethanesulfonate 1-Butyl-1-Methylpyrrolidinium bis(oxalate)borate, 1-Butyl-1-Methylpyrrolidinium Dicyanamide, 1-Butyl-1-methylpyrrolidinium trifluoromethanesulfonate, 1-Butyl-3-methylimidazolium iodide, 1-Ethyl-3-Methylimidazolium Dicyanamide, 1-Ethyl-3-methylimidazolium diethyl phosphate, 1-Ethyl-3-methylimidazolium methyl-phosphonate, 1-Ethyl-3-methylimidazolium trifluoromethanesulfonate, 1-Ethyl-3-methylimidazolium trifluoromethanesulfonate, 1-Hexyl-3-methylimidazolium trifluoromethanesulfonate, 3-Methyl-1-propylimidazolium iodide, N-Tributyl-N-methylammonium iodide, N-Trimethyl-N-butylammonium bromide Hydrophobic ionic liquids can be used with natural materials, e.g. cotton, silk or wool. Examples of hydrophobic ionic liquids include: BMIMPF$_6$ (1-Butyl-3-methylimidazolium hexafluorophosphate), (N,N-diethyl-N-methyl-N(2methoxyethyl)ammonium bis(fluorosulfonyl)imide, (N,N-diethyl-N-methyl-N(2methoxyethyl)ammonium bis(trifluoromethanesulfonyl)imide, 1-Allyl-3H-imidazolium bis(trifluoromethanesulfonyl)imide, 1-Butyl-1-methylpyrrolidinium bis(fluorosulfonyl)imide, 1-Butyl-1-methylpyrrolidinium bis(fluorosulfonyl)imide, 1-Butyl-1-methylpyrrolidinium bis(trifluoromethanesulfonyl)imide, 1-Butyl-1-methylpyrrolidinium bis(trifluoromethanesulfonyl)imide, 1-Butyl-3-methylimidazolium bis(trifluoromethanesulfonyl)imide, 1-Butyl-3-methylimidazolium bis(trifluoromethanesulfonyl)imide, 1-Ethyl-3-methylimidazolium bis(fluorosulfonyl)imide, 1-Ethyl-3-methylimidazolium bis(fluorosulfonyl)imide, 1-Ethyl-3-methylimidazolium bis(trifluoromethanesulfonyl)imide, 1-Ethyl-3-methylimidazolium bis(trifluoromethanesulfonyl)imide, 1-Ethyl-3-methylimidazolium bis(trifluoromethanesulfonyl)imide, 1-Hexyl-3-methylimidazolium bis(trifluoromethanesulfonyl)imide, 1-Hexyl-3-methylimidazolium bis(trifluoromethanesulfonyl)imide, 1-Methyl-1-(2-methoxyethyl)pyrrolidinium bis(fluorosulfonyl)imide, 1-Methyl-1-(2-methoxyethyl)pyrrolidinium bis(trifluoromethanesulfonyl)imide, 1-Methyl-1-(3-methoxypropyl)pyrrolidinium bis(fluorosulfonyl)imide, 1-Methyl-1-(3-methoxypropyl)pyrrolidinium bis(trifluoromethanesulfonyl)imide, 1-Methyl-1-octylpyrrolidinium bis(trifluoromethanesulfonyl)imide, 1-Methyl-1-octylpyrrolidinium bis(trifluoromethanesulfonyl)imide, 1-Methyl-1-pentylpyrrolidinium bis(trifluoromethanesulfonyl)imide, 1-Octyl-3-methylimidazolium bis(trifluoromethanesulfonyl)imide, H-3-methylimidazolium bis(trifluoromethanesulfonyl)imide, N,N-Diethyl-N-methyl-N-propylammonium bis(fluorosulfonyl)imide, N,N-Diethyl-N-methyl-N-propylammonium bis(fluorosulfonyl)imide, N,N-dimethyl-N-ethyl-N-(3-methoxypropyl)ammonium bis(fluorosulfonyl)imide, N,N-dimethyl-N-ethyl-N-(3-methoxypropyl)ammonium bis(trifluoromethanesulfonyl)imide, N,N-Dimethyl-N-ethyl-N-benzylAmmonium bis(trifluoromethanesulfonyl)imide, N,N-Dimethyl-N-Ethyl-N-Phenylethylammonium bis(trifluoromethanesulfonyl)imide, N-butyl-N-methylpiperidinium bis(trifluoromethanesulfonyl)imide, N-butyl-N-methylpiperidinium bis(trifluoromethanesulfonyl)imide, N-Ethyl-N,N-dimethyl-N-(2-methoxyethyl)ammonium bis(fluorosulfonyl)imide, N-Ethyl-N,N-dimethyl-N-(2-methoxyethyl)ammonium bis(trifluoromethanesulfonyl)imide, N-propyl-N-methylpiperidinium bis(fluorosulfonyl)imide, N-propyl-N-methylpiperidinium bis(fluorosulfonyl)imide, N-propyl-N-methylpiperidinium bis(trifluoromethanesulfonyl)imide, N-propyl-N-methylpiperidinium bis(trifluoromethanesulfonyl)imide, N-Propyl-N-methylpyrrolidinium bis(fluorosulfonyl)imide, N-Propyl-N-methylpyrrolidinium bis(fluorosulfonyl)imide, N-Propyl-N-methylpyrrolidinium bis(trifluoromethanesulfonyl)imide, N-Propyl-N-methylpyrrolidinium bis(trifluoromethanesulfonyl)imide, N-Tributyl-N-methylammonium bis(trifluoromethanesulfonyl)imide, N-Tributyl-N-methylammonium dicyanamide, N-Tributyl-N-methylammonium bis(trifluoromethanesulfonyl)imide, N-Trimethyl-N-butylammonium bis(fluorosulfonyl)imide, N-Trimethyl-N-butylammonium bis(fluorosulfonyl)imide, N-Trimethyl-N-butylammonium bis(trifluoromethanesulfonyl)imide, N-Trimethyl-N-butylammonium bis(trifluoromethanesulfonyl)imide, N-Trimethyl-N-hexylammonium bis(trifluoromethanesulfonyl)imide, N-Trimethyl-N-hexylammonium bis(trifluoromethanesulfonyl)imide, N-Trimethyl-N-propylammonium bis(fluorosulfonyl)imide, N-Trimethyl-N-propylammonium bis(fluorosulfonyl)imide, N-Trimethyl-N-propylammonium bis(trifluoromethanesulfonyl)imide, N-Trimethyl-N-propylammonium bis(trifluoromethanesulfonyl)imide, Trihexyl(tetradecyl)phosphonium chloride The ionic liquid may be selected from: BMIMPF$_6$ (1-Butyl-3-methylimidazolium hexafluorophosphate), [DEME][TFSI] (Diethylmethyl(2-methoxyethyl)ammonium bis(trifluoromethylsulfonyl)imide),1-Butyl-1-methylpyrrolidinium bis(fluorosulfonyl)imide, 1-Ethyl-3-methylimidazolium bis(trifluoromethylsulfonyl)imide, 1-Methyl-1-propylpyrrolidinium bis(trifluoromethylsulfonyl)imide, N-Trimethyl-N-propylammonium bis(trifluoromethanesulfonyl)imide, N-Propyl-N-methylpyrrolidinium bis(fluorosulfonyl)imide, 1-Butyl-1-methylpiperidinium bis(trifluoromethylsulfonyl)imide, 1-Butyl-3-methylimidazolium tetrafluoroborate, and 1-(2-Hydroxyethyl)-3-methyl-1H-imidazol-3-ium tetrafluoroborate.

Alternatively, a liquid electrolyte may be used in place of the ionic liquid. Liquid electrolytes are defined as salts dissolved in organic or inorganic solvents. When present, the liquid electrolyte may be selected from: LiCl, LiClO$_4$, NaClO$_4$ or 1-Ethyl-3-methylimidazolium chloride dissolved in any of PEO200, PEO400, PEO600, sulfolane and [DEME][TFSI].

The conductor may comprise a material selected from: silver, stainless steel, gold, graphene, carbon composite, and reduced graphene oxide. The conductor may comprise stainless steel.

The conductor may further comprise a protective layer. This protective layer may prevent undesirable interaction between the conductor and the ionic liquid or liquid electrolyte.

The conductor may be porous. This facilitates production of the devices.

The conductor may be a foil. The conductor may be a gold, silver or stainless steel foil. Where the conductor is a foil, it may comprise holes to allow introduction of the ionic liquid or liquid electrolyte to the substrate.

The conductor may be a mesh. The conductor may be a stainless steel mesh.

The conductor may be sputtered. The conductor may be sputtered gold. The conductor may be sputtered stainless steel.

The conductor may be a conductive textile, e.g. a conductive textile comprising silver.

The conductor may be in contact with substantially all of the portions of the second surface of the substrate that correspond to the portions of the first surface of the substrate that are in contact with the active layer. The conductor may be a single conductive object. Where the conductor is a conductive layer, the conductive layer may be patterned such that it comprises a plurality of single conductive patches ('pixels') that are electrically isolated from one another.

The device may comprise a power source which provides an electrical potential to the means for applying a controllably variable electrical potential between the conductor and the active layer.

Where the device is pixelated, the means for applying a controllably variable electrical potential between the conductive layer and the active layer may be a means for applying a controllably variable electrical potential independently between each pixel of the conductor and the active layer. In these embodiments, the device typically comprises or is connected to a processor configured to control the electrical potential that is independently applied between each pixel of the conductive layer and the active layer.

The invention also provides a garment comprising the device of the invention. In these embodiments, the material of which the garment is made typically the substrate. It may be that the active layer is in contact with one or more portions of the external surfaces of the garment. Alternatively, it may be that the active layer is in contact with substantially all of the external surfaces of the garment. In embodiments, a portion of the material of which the garment is made is the substrate of the device of the invention. It may be that the active layer is in contact with one or more portions of the first surface of the substrate. Alternatively, it may be that the active layer is in contact with substantially all of the first surface of the substrate. Suitable garments include socks, trousers, shirts, t-shorts, gloves, jumpers, sweatshirts, hats, masks and bodysuits.

The invention also provides a cover comprising the device of the invention. In these embodiments, the material of which the cover is made typically the substrate. It may be that the active layer is in contact with one or more portions of one surface of the cover. Where the cover has an external surface and an internal surface, the active layer will typically be in contact with the external surface of the cover. Alternatively, it may be that the active layer is in contact with substantially all of one surface (e.g. the external surface) of the cover. In embodiments, a portion of the material of which the cover is made is the substrate of the device of the invention. It may be that the active layer is in contact with one or more portions of the first surface of the substrate. Alternatively, it may be that the active layer is in contact with substantially all of the first surface of the substrate. The cover may be a blanket for one or more people or it may be a cover for a domestic radiator or a building.

Methods of Varying the Emissivity of a Surface

It may be that the electrical potential that is applied between the conductor layer and the active layer is varied between −10 V and 10 V. It may be that the electrical potential that is applied between the conductor layer and the active layer is varied between 0 and 10 V. It may be that the electrical potential that is applied between the conductor and the active layer is varied between 0 and 5 V.

Where the conductor is a pixelated conductive layer the step of varying the electrical potential that is applied between the conductive layer and the active layer, typically comprises independently varying the electrical potential that is applied between each pixel of the conductive layer and the active layer.

Alternatively, the electrical potential may be applied between substantially all of the conductive layer and the active layer.

Typically, the emissivity that is being controlled in the method of the invention is the emissivity of the surface in the infra-red range. The emissivity that is being controlled in the method of the invention may be the emissivity of the surface in the wavelength range 0.7 µm to 50 µm.

Methods of Making a Device

The method of making the device of the first aspect may further comprise forming a plurality of graphene layers on a foil to generate the active layer. The layers may be formed by CVD. The foil is preferably Ni foil. The method may comprise separating the plurality of graphene layers from the foil, e.g. by etching.

Where a protective layer is in contact with the first surface of the active layer, the process may comprise to step of affixing the protective layer to the first surface of the active layer. The introduction of the protective layer onto the first surface of the active layer may occur prior to removal of the foil, where the plurality of graphene layers are grown on a foil.

The step of affixing the protective layer to the first surface of the active layer may further comprise applying an adhesive onto the first surface of the active layer and/or the protective layer and then contacting the protective layer and the first surface of the active layer. The adhesive may be sufficiently porous to allow ion transport between the substrate and the active layer. The adhesive may cover 50% or less (e.g. 10% or less) of the second surface of the active layer. The adhesive may be a hot melt adhesive.

Alternatively, the step of affixing the protective layer to the first surface of the active layer may further comprise treatment of the protective layer and then contacting the protective layer and the first surface of the active layer. The treatment of the protective layer may be treatment with a plasma, e.g. an oxygen plasma.

The step of affixing the second surface to the active layer with the first surface of the substrate may further comprise applying an adhesive onto the first surface of the substrate and then contacting the second surface of the active layer to the first surface of the substrate. The adhesive may be sufficiently porous to allow ion transport between the substrate and the active layer. The adhesive may cover 100% or less of the second surface of the active layer. The adhesive may cover 50% or less (e.g. 10% or less) of the second surface of the active layer. The adhesive may be a hot melt adhesive.

Alternatively, the step of affixing the second surface of the active layer to the first surface of the substrate may further comprise treatment of the first surface of the substrate layer and then contacting the second surface of the active layer with the first surface of the substrate. The treatment of the substrate layer may be treatment with a plasma, e.g. an oxygen plasma.

Where the conductor is porous, the step of diffusing ionic liquid or liquid electrolyte into the substrate typically comprises applying the ionic liquid or liquid electrolyte to the conductor and allowing the ionic liquid or liquid electrolyte to diffuse into the substrate.

The method of making the device may further comprise attaching the active layer and the conductor to the means for applying the electrical potential to the device.

It may be that step i) occurs before step ii). It may be that step ii) occurs before step i).

It may be that the method comprises: affixing the protective layer to the first surface of the active layer to form a first composite; affixing the conductor to the second surface of the substrate to form a second composite; affixing the second surface of the active layer of the first composite to the first surface of the substrate of the second composite; and diffusing ionic liquid or liquid electrolyte into the substrate.

Typically, the methods of the invention provide a device of the first aspect in which the graphene atomic layers may have a graphitic structure. The method may comprise applying an electrical potential between the conductive layer and the active layer to form a device of the first aspect in which the graphene atomic layers are in the form of graphene flakes (i.e. single layer graphene flakes, few-layer graphene flakes or a mixture thereof). Typically, ions from the ionic liquid or liquid electrolyte will be intercalated between said graphene flakes.

BRIEF DESCRIPTION OF THE DRAWINGS

Embodiments of the invention are further described hereinafter with reference to the accompanying drawings, in which:

FIG. 11 shows the performance of a device of the invention fabricated on a t-shirt. (a) Photograph and thermographs for (b) high emissivity and (c) low emissivity states. The infrared emission from the subject's body is modulated to communicate a message in the infrared. (d) Modulation of the apparent temperature of the device communicating letters "N", "G", and "I" in Morse code. Temperature scale is reversed as the apparent temperature is suppressed when the device is on.

DETAILED DESCRIPTION

Figure 1:
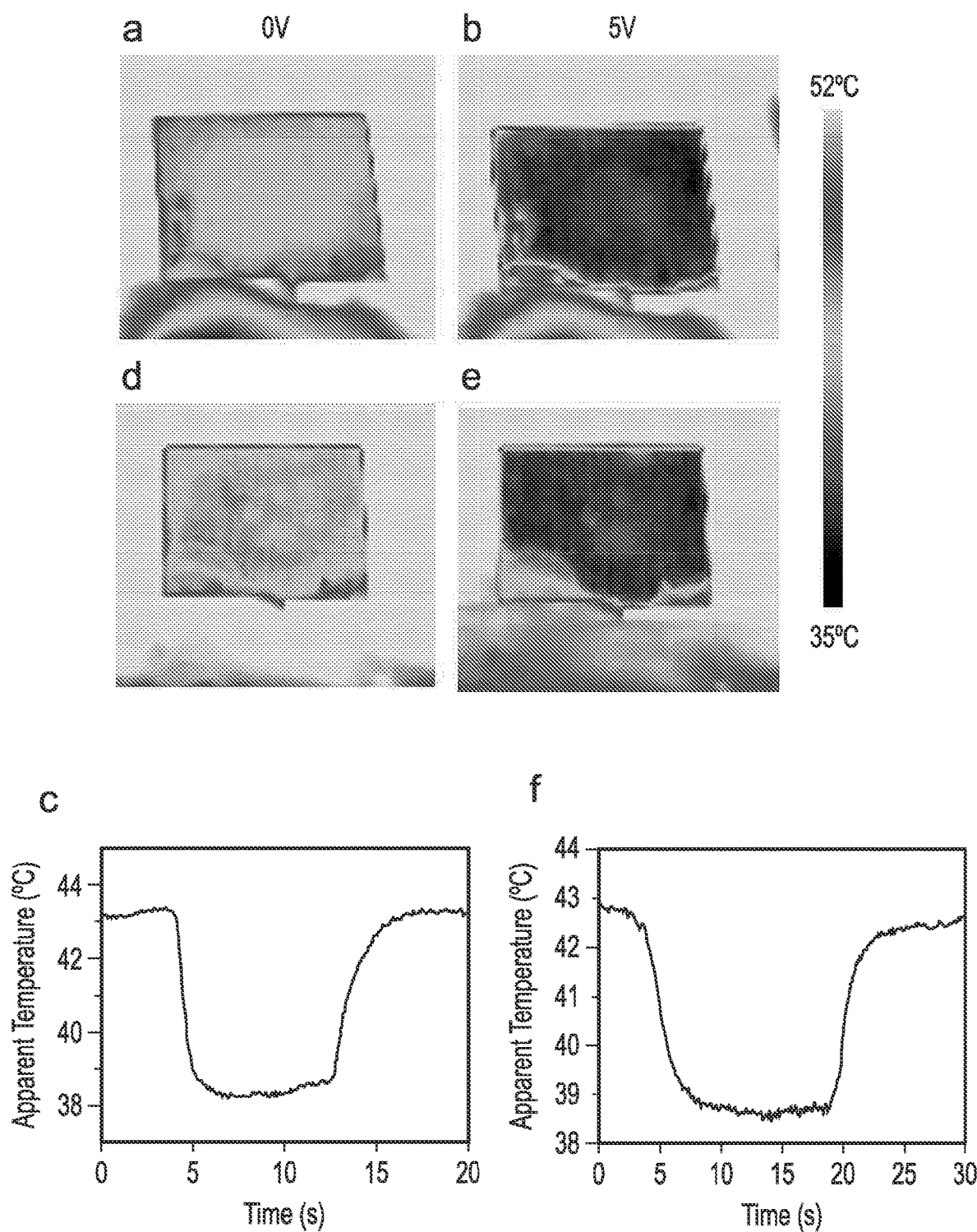
FIG. 1 shows measurements of a device comprising MLG on cotton and stainless steel mesh back electrode after washing cycles. (a), (b) Thermographs and (c) temporal change in the apparent temperature of a device. MLG on cotton is washed 10 cycles prior to the measurements. (d-f) Measurement results after removing and washing the MLG on cotton layer one more cycle.

The term 'emissivity' refers to the ability of a surface of a material to emit energy as thermal radiation. Emissivity has a value between 0 and 1, and is quantitatively defined as the ratio of the thermal radiation from a material's surface to the radiation from an ideal black surface (i.e. a perfect emitter) at the same temperature and wavelength under the same conditions. The emissivity of a surface may be calculated by Fourier transform infrared spectroscopy (FTIR) measurements.

Ionic liquids are salts which are liquid at temperatures below 100° C. The ionic liquid will typically be liquid at 20° C. Preferably, the ionic liquids will liquid at 0° C. Ionic liquids may also be referred to as liquid electrolytes. The ionic liquids typically comprise an organic cation and either an inorganic or organic anion.

The term 'infra-red radiation' typically refers to electromagnetic radiation having wavelengths in the range of 0.7 µm to 50 µm. In certain embodiments of this invention, the term 'infra-red radiation' may refer to electromagnetic radiation having wavelengths in the range of 8 µm to 13 µm.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

Examples

With this invention, the inventors introduce an optical textile technology by merging the electro-optical tunability of chemical vapour deposition (CVD)-grown graphene with novel textile devices. They show real-time electrical control of the infrared radiation in the wavelength range of 0.7-25 µm and reconfigurable infrared patterns from the device surface. The materials and the integration scheme reported here are compatible with the state-of-the-art large-area textile processing and a variety of textile materials, including, but not limited to, cotton, polyester, non-woven synthetics, conductive textiles, and yarns. These serve as not just a mechanical support, but also electrical separator, electrode, and ionic medium. The potential impact of the functional infrared textiles is highlighted by two showcase applications: merging sensing and display capabilities on a multipixel textile device and communicating a message in the long wavelength infrared by modulating the radiation from the human body.

Figure 2:
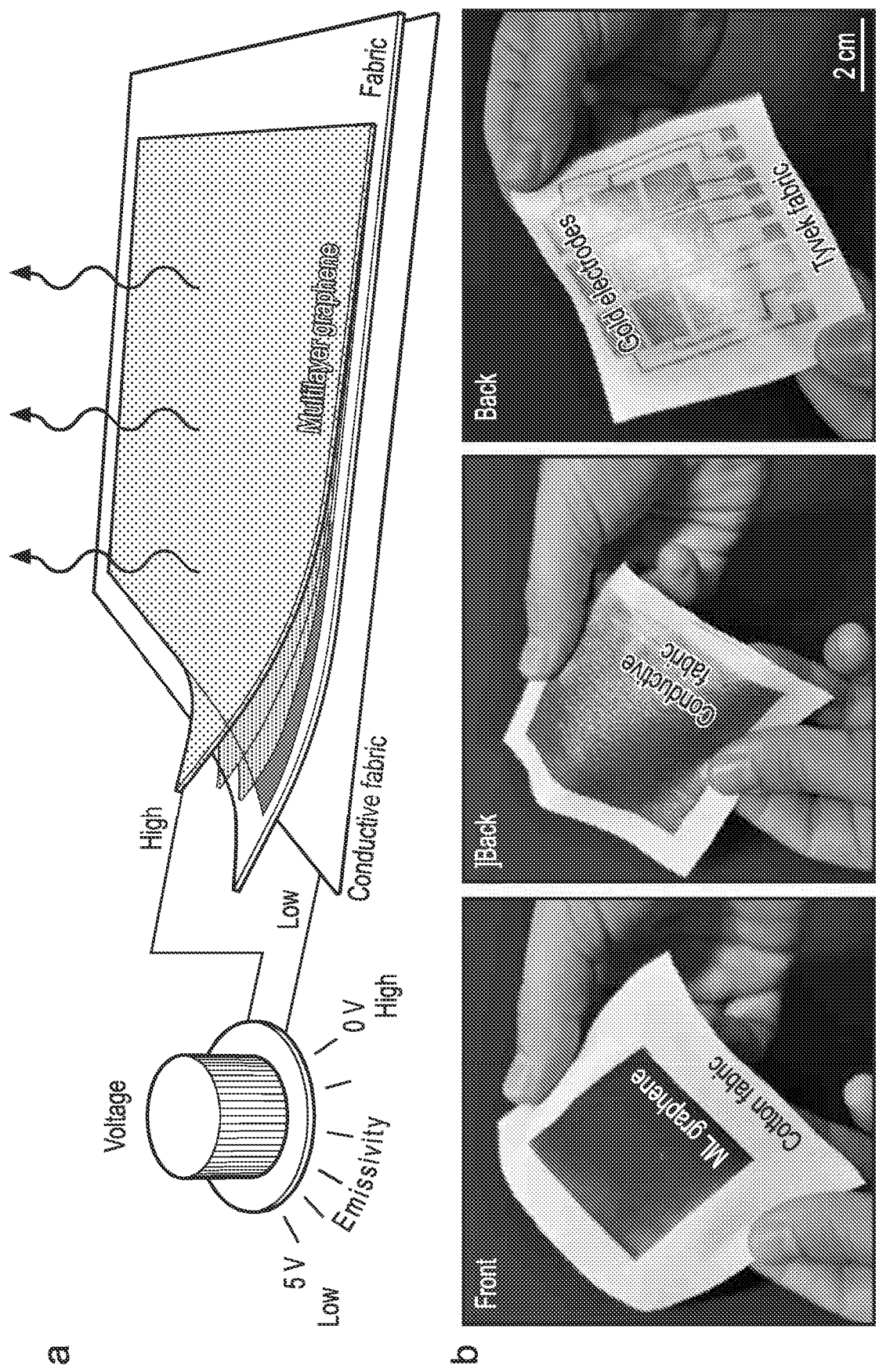
FIG. 2 shows examples of the device of the present invention. (a) Illustration of a textile device with various laminated layers: multilayer graphene, fabric separator and back electrode layer. The infrared emissivity of the device is modulated by applying a voltage difference between the top graphene layer and back electrode layer to initiate intercalation of ions into the graphene layers. The protective layer is not shown in this figure for clarity. (b) Examples of fabricated devices on various textile materials such as woven cotton fabric and nonwoven high-density polyethylene fabric. Continuous conductive textiles or patterned gold electrodes can be used as the back electrode.
Figure 3:
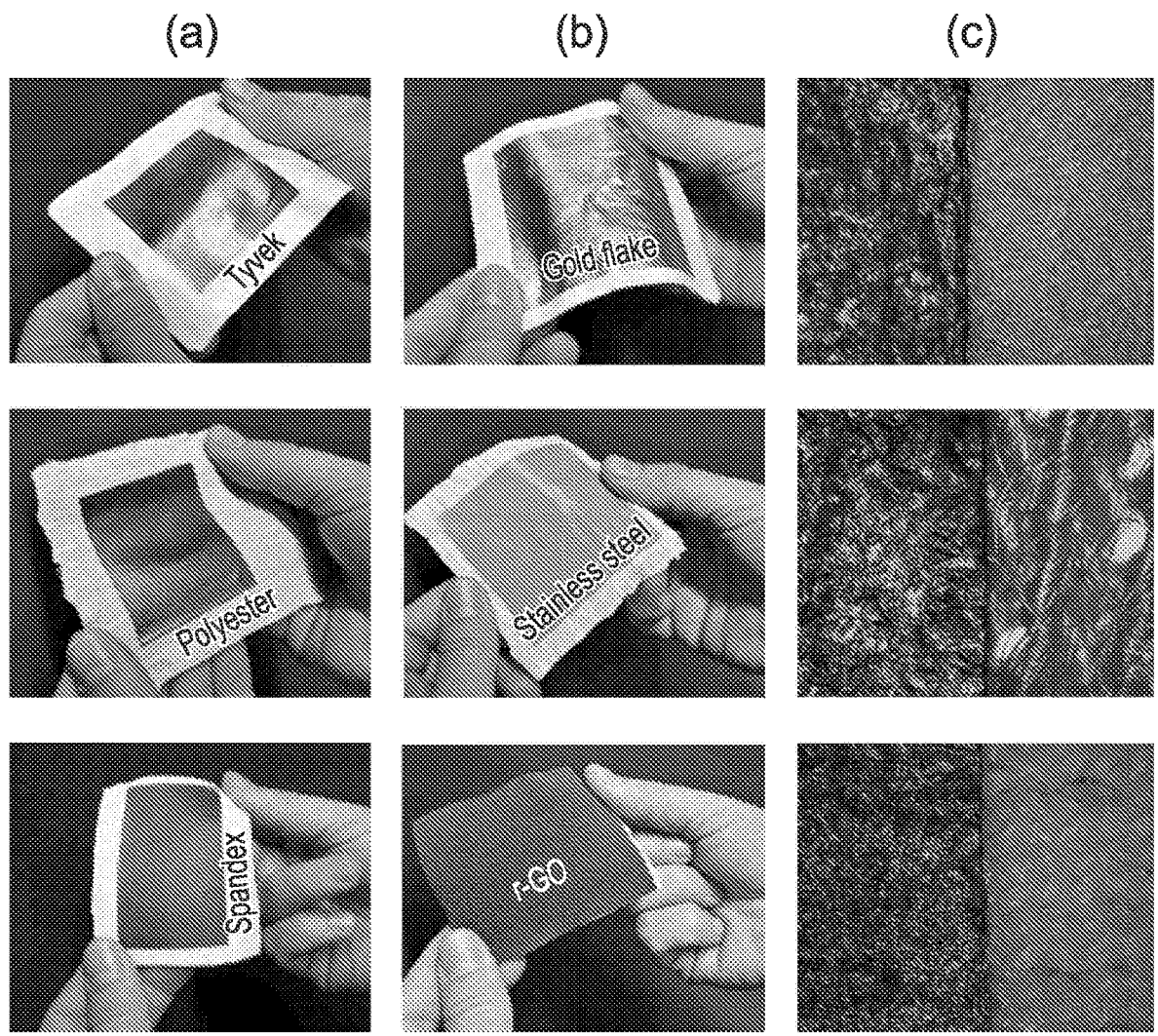
FIG. 3 shows textile devices based on a variety of materials. (a) Front and (b) back sides of textile devices based on non-woven high density polyethylene (Tyvek), polyester, and spandex substrates and gold flake, stainless steel mesh, and reduced graphene back electrodes. (c) Microscope images of the MLG (left) and textile (right) surfaces

The devices consist of laminated layers of infrared transparent polymer layer, CVD-grown multilayer graphene (MLG), a fabric separator layer, and conductive fabric. FIG. 2 shows a schematic drawing of a device and its operation. The fabrication starts with growing multilayer graphene layers on Ni foils (detailed in Materials and Methods section below). A thin polyethylene (PE) film that functions as an infrared-transparent protective layer is laminated on multilayer graphene prior to etching the Ni foil. MLG on polyethylene sheet is attached onto a fabric, e.g., a cotton twill weave, with hot melt adhesive. Good adhesion between the multi-layer graphene (MLG) and the substrate is important for any wearable application. Thus, the stability of the MLG on textile was tested under bending and during washing via mechanical bending/compression tests and washing cycles. The infrared emissivity of MLG attached on cotton textile shows no sign of deterioration after the mechanical and washing tests (FIG. 1), showing the high endurance and flexibility of the devices. The sheet resistance of MLG attached on cotton textile also showed no deterioration after the mechanical and washing tests. The back electrode, e.g., conductive fabric, is fused to the back side of the fabric forming the complete device (FIG. 2a). In the final step, the ionic liquid electrolyte ($BMIMPF_6$) is applied onto the back electrode and allowed to diffuse into the textile substrate. The textile acts as both the separator and ionic conductive layer, allowing ionic motion when a voltage difference is applied to MLG and the back electrode. FIG. 2b shows representative examples of the fabricated devices on the natural and synthetic textile materials, woven cotton and nonwoven high-density polyethylene clothing, respectively (see FIG. 3 for more examples).

The inventors have investigated various back electrode materials including silver-based conductive textiles, stainless steel mesh, sputtered gold, graphene, and reduced graphene oxide. The electrochemical stability of the back electrode plays a critical role for the long term stability of the device. An array of patterned back electrodes and wiring on textile can be fabricated with photolithography followed by metallization and lift-off process (FIG. 2b and Materials and Method section). These pixel electrodes allow the definition of dynamic infrared patterns on a continuous graphene layer via area-selective intercalation.

Figure 4:
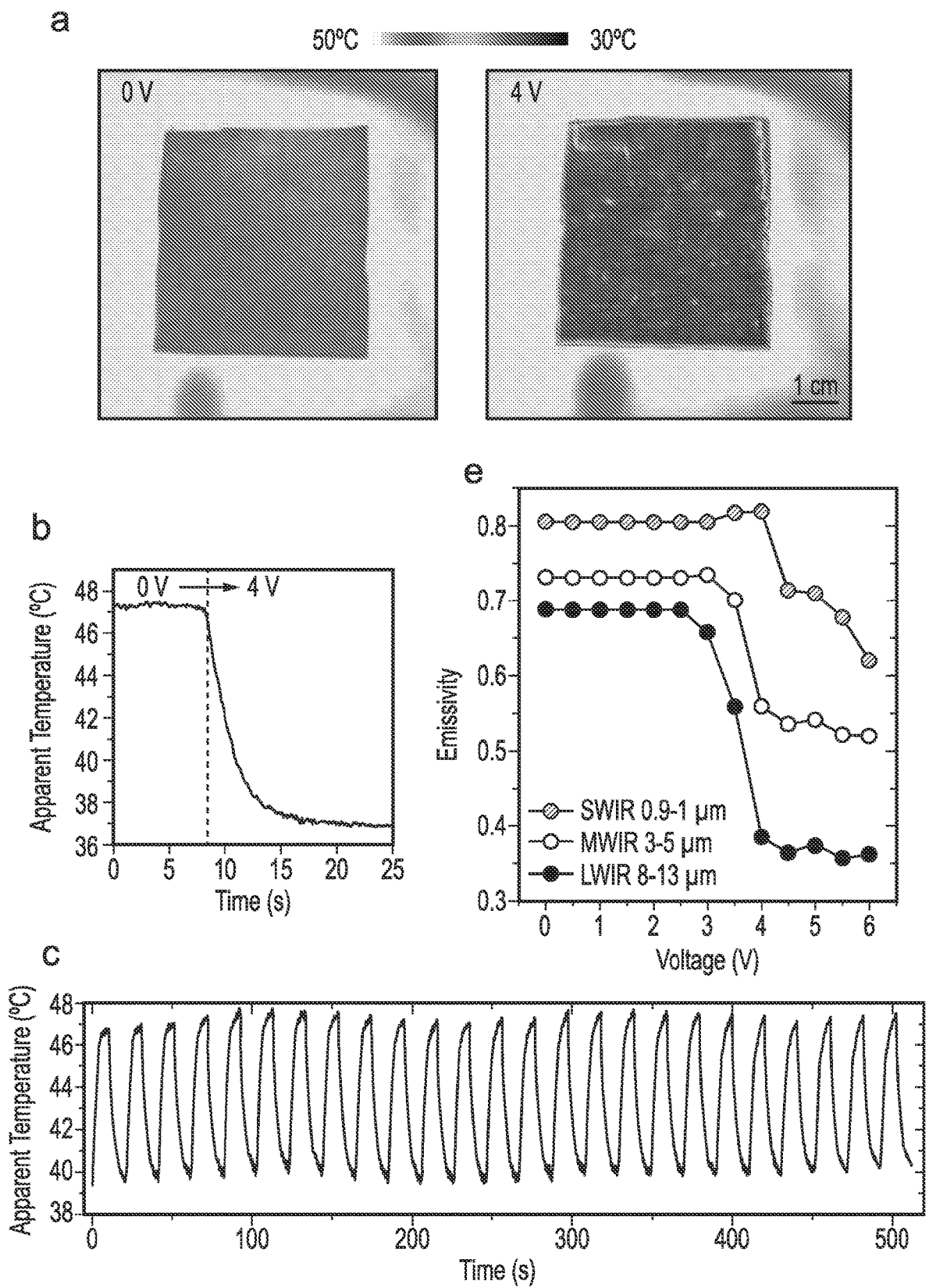
FIG. 4 shows the effect of electric potential on the emissivity of the devices of the invention. (a) Thermal images of a cotton-based textile device recorded with a long-wavelength (8-13 µm) infrared camera in high emissivity (0 V) and low emissivity (4 V) states at 55° C. (b) The temporal change in the apparent temperature of the device after applying 4 V. (c) Long term temporal variation in the apparent temperature under a periodic square voltage waveform (−2 and 4 V) with a period of 20 s. (d) Infrared reflection spectra of the device recorded as the applied voltage varies from 0 V to 6 V. (e) The average emissivity of the device in the short, medium and long wavelength infrared regimes as a function of the applied voltage. The threshold voltage of the device is 2.5 V for long-wavelength infrared (LWIR).
Figure 4:
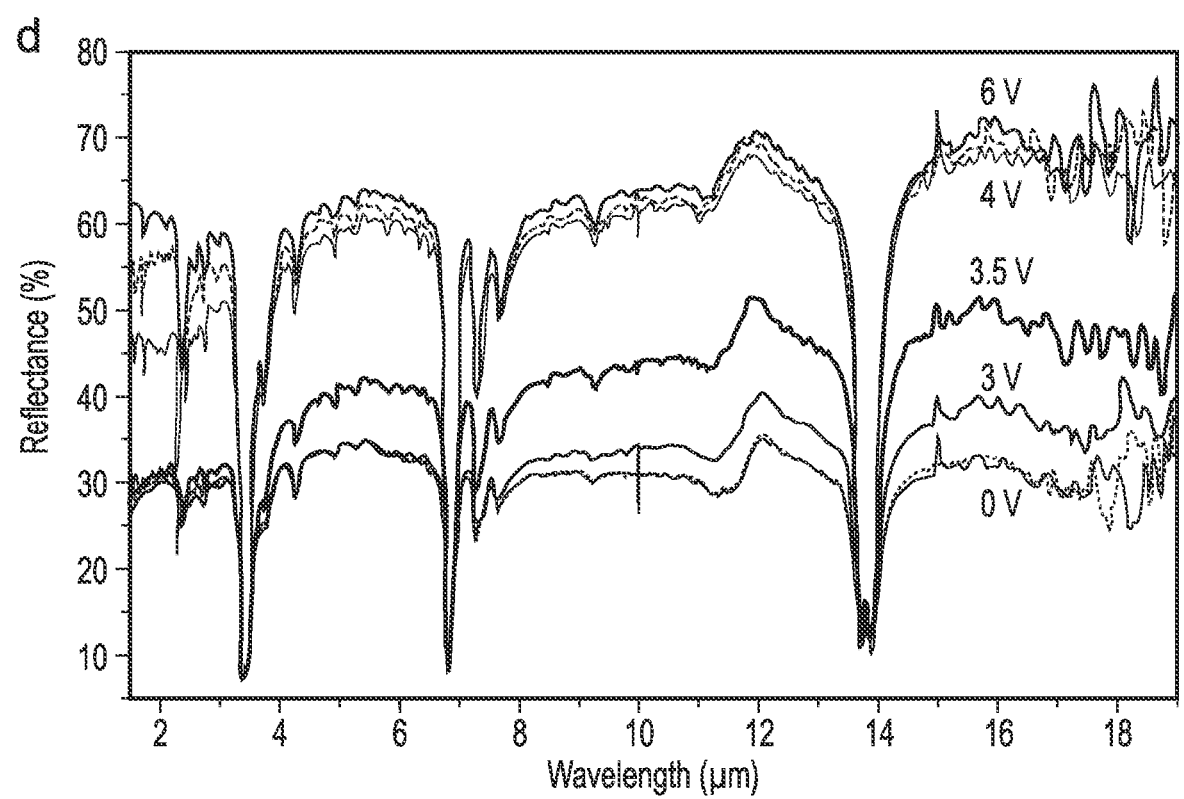
Figure 5:
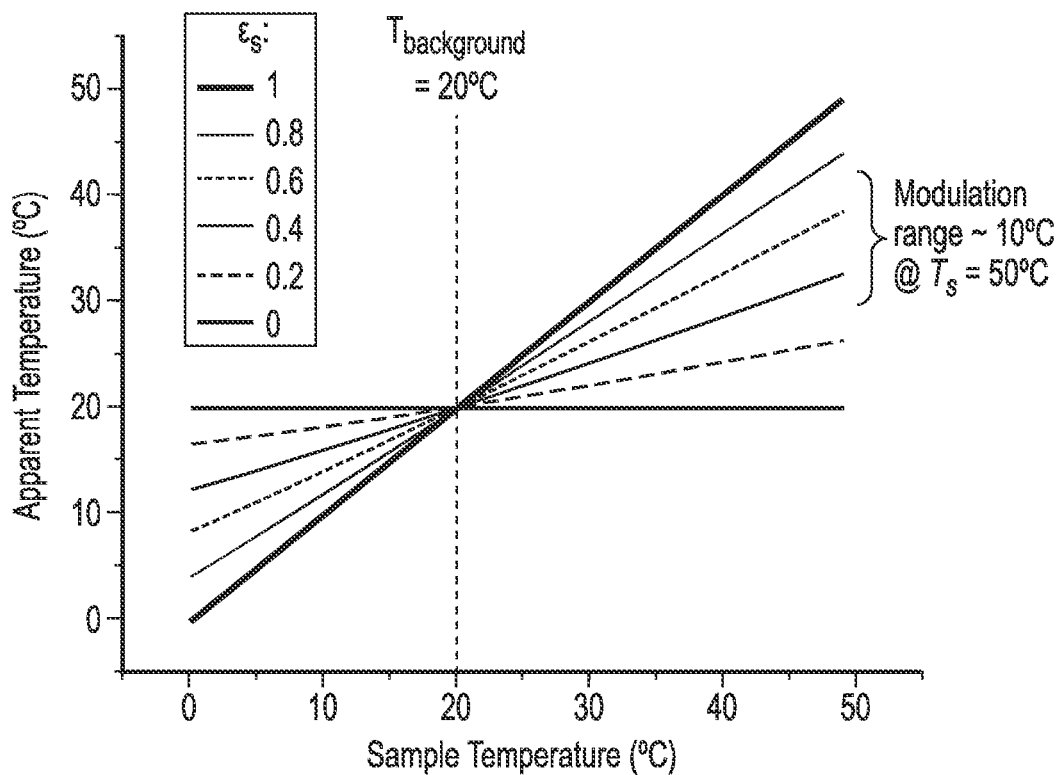
FIG. 5 shows the calculated apparent temperature of a sample for the actual sample temperature varying between 0 and 50° C. and emissivity varying between 0 and 1 at 20° C. and 5° C. background temperatures. Apparent temperature ($T_a$) is calculated using the following expression: $\varepsilon_a T_a^4 = \varepsilon_s T_s^4 + (1-\varepsilon_s) T_b^4$, where $\varepsilon_a$ is the emissivity setting of the thermal camera (typically 1), $\varepsilon_s$ is the emissivity of the sample (varying in the calculations), $T_s$ is the sample temperature, and $T_b$ is the background temperature characterized by the thermal camera. Note that $(1-\varepsilon_s)$ is the reflectivity of the sample. The modulation ranges are calculated at the sample temperature of 50° C. and $\varepsilon_s$ range of 0.35-0.7 as characterized by the Fourier transform infrared spectroscopy (FTIR) measurements.
Figure 5:
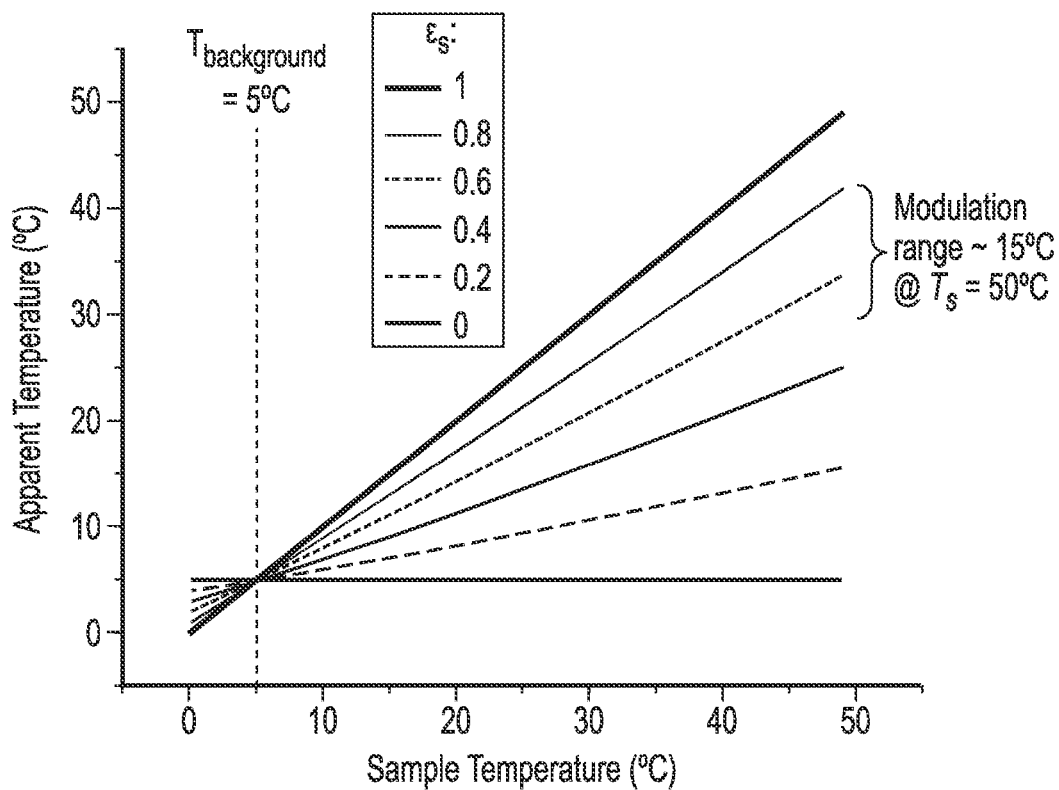

The working principle of the devices is based on reversible intercalation of the ions into the graphene layers and modulating its electrical and optical properties (Salihoglu, O. et al. Graphene-Based Adaptive Thermal Camouflage. *Nano Lett.* 18, 4541-4548, 2018). At 0 V, multi-layer graphene has high infrared absorption which leads to high emissivity revealing the actual temperature of the device (FIG. 4a). When a sufficient voltage difference is applied (>2.5 V), the ionic liquid intercalates into the graphene layers, enhancing the optical conductivity and suppressing the emissivity, therefore concealing the actual device temperature. The thermographs of the device are recorded with a long wavelength infrared camera which renders images based on the Stefan-Boltzmann law, $P=\varepsilon\sigma T^4$, where P is the amount of incident thermal radiation on the bolometer array, $\varepsilon$ is the emissivity of the surface kept constant during rendering, $\sigma$ is the Stefan-Boltzmann constant and T is the temperature of the surface in degrees Kelvin. The temperature rendered by the camera (apparent temperature, $T_a$) is a function of P, hence $\varepsilon$ and T, and the emissivity setting of the camera, $\varepsilon_a$ (typically 1): $T_a = T(\varepsilon/\varepsilon_a)^{1/4}$. If the background emission reflected from the sample surface is non-negligible, it has to be accounted for. The textile devices are kept in thermal contact with the heat sources, e.g., human body, to prevent false screening of the source temperature. Complete intercalation (supressing emissivity) takes ~5 s when the device current is not limited. Note that these measurements were recorded in a closed lab environment which has background thermal radiation (21° C.) limiting the minimum apparent temperature (see FIG. 5). The devices can be cycled steadily between high and low emissivity states many times (FIG. 4c), however, exceeding the electrochemical window of the electrolyte degrades the device performance.

Figure 6:
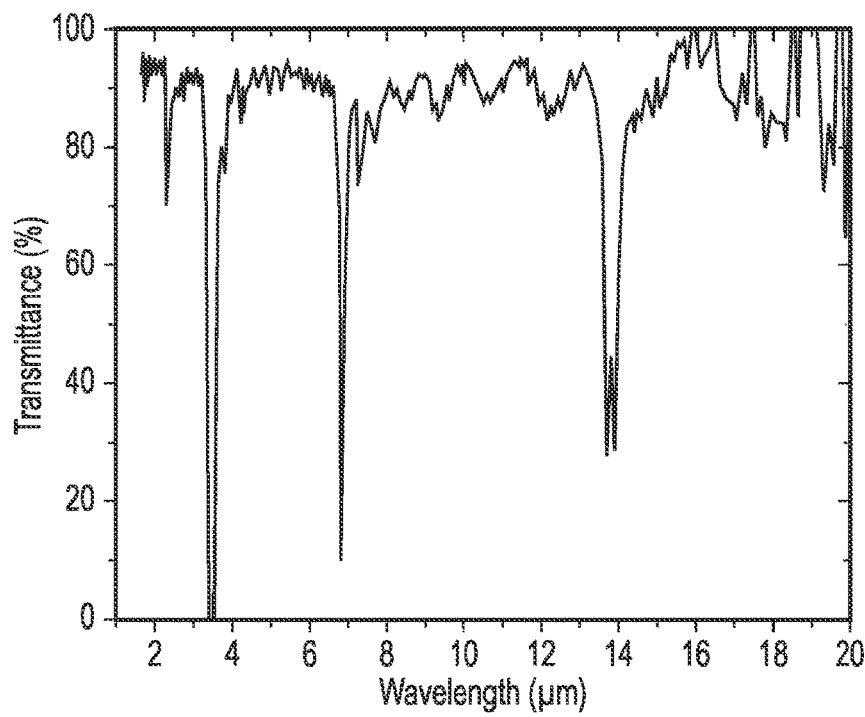
FIG. 6 shows the infrared transmission spectra for 20 µm thick polyethylene film.

The emissivity modulation was quantified by infrared and near-infrared reflection measurements using a Fourier-transform infrared spectrometer (FTIR) equipped with an integrating sphere. At 0 V, the reflectance of the intrinsic device is almost flat at ~30% except for the fingerprint absorptions of the top polyethylene film at wavelengths ~3.4 µm, ~6.8 µm, ~13.9 µm, and atmospheric absorptions, e.g. $CO_2$, $H_2O$ (FIG. 4d). In the spectral sensitivity range of the thermal camera (8-13 µm), such absorptions are minimized owing to the careful selection of the top protection film (see FIG. 6 for the transmission spectrum of the polyethylene film).

The emissivity (or absorptivity) is calculated as 1−R, where R is the reflectance, as no light passes through the device. As the ions intercalate the graphene layers, the Fermi energy and the optical conductance of MLG increase, enhancing the infrared reflectance. The Pauli blocking of infrared absorption and the increased Drude optical conductivity of graphene are the main factors in the enhanced infrared reflectance (Mak, K. F., Ju, L., Wang, F. & Heinz, T. F. Optical spectroscopy of graphene: From the far infrared to the ultraviolet. *Solid State Commun.* 152, 1341-1349, 2012). The reflectance modulation is more pronounced for the longer wavelengths due to Drude type behaviour of free electrons on graphene. The average emissivity of the device in the wavelength range of 8-13 µm is high (~0.7) for 0 V and is maintained up to a threshold voltage (~2.5 V) followed by a sharp drop to ~0.35 for >4 V (FIG. 4e). The emissivity modulation covers both the long-wavelength infrared (LWIR, 8-13 µm) and medium-wavelength infrared (MWIR, 3-5 µm) ranges. In the MWIR, however, the polyethylene film exhibits a major absorption due to C—H stretching mode that is unaffected with the applied voltage, limiting the emissivity modulation range to ~0.7-0.5 (FIG. 4e).

Figure 7:
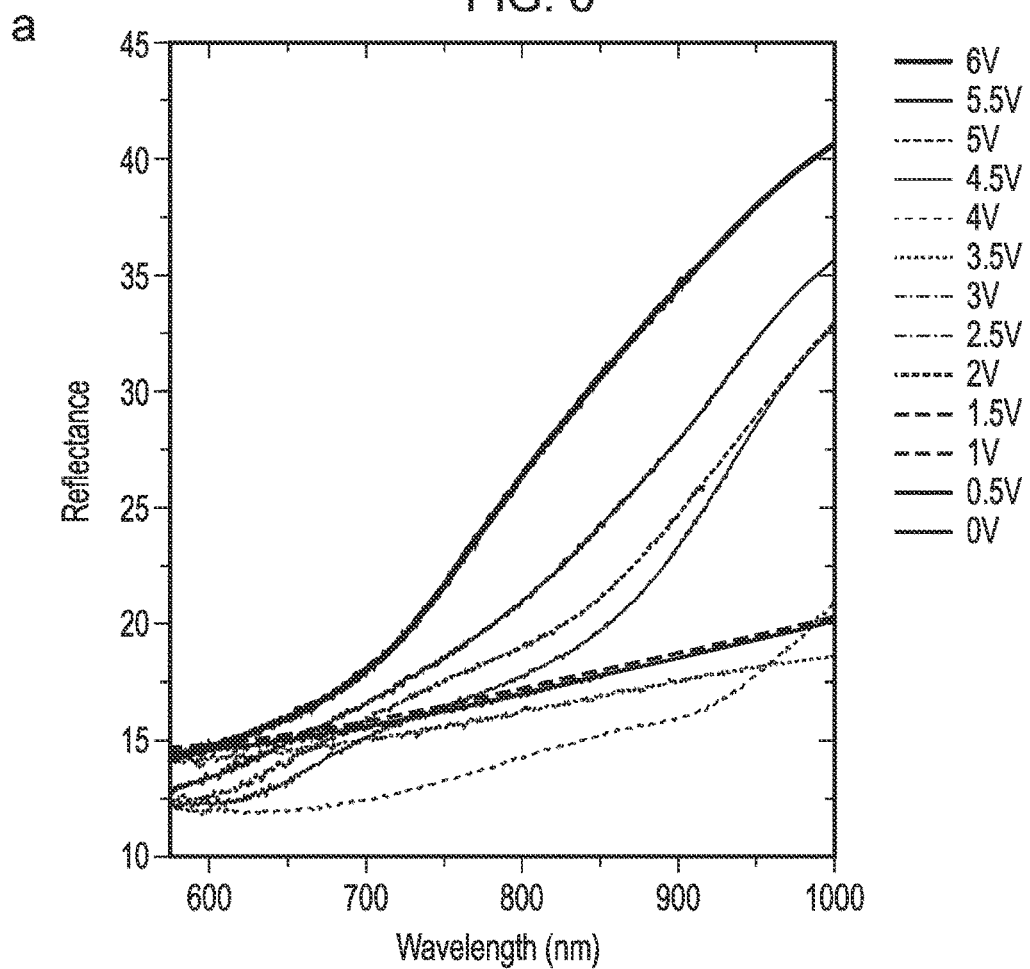
FIG. 7 shows near-infrared data for the devices of the invention. (a) Near infrared reflection spectrum of the device as a function of the applied voltage. (b) Near-infrared images of a device for on/off conditions at room temperature.
Figure 7:
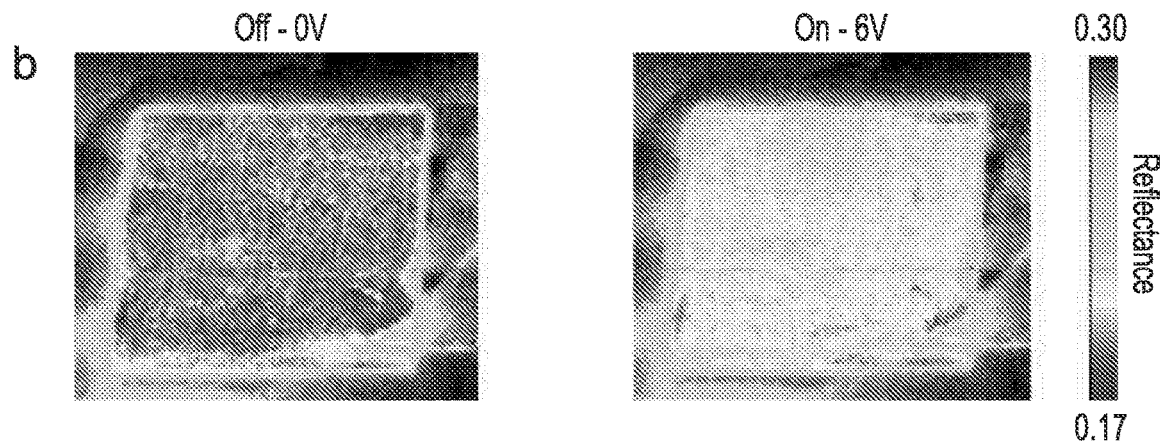

Another effect of the polyethylene layer is the enhanced emissivity of the surface owing to thermal extraction by polyethylene whose refractive index is larger than that of air (Yu, Z. et al. Enhancing far-field thermal emission with thermal extraction. *Nat. Commun.* 4, 2013). Relatively small emissivity modulation (0.2-0.4) was observed in the short-wavelength infrared (SWIR, 0.9-1.7 µm) range. Nonetheless, the modulation in the SWIR can be detected by a silicon CCD camera with a near-infrared cut-on filter (FIG. 7). The modulation in the visible spectrum is negligible due to insufficient doping of graphene. The optical modulation can be enhanced in the near-infrared and further pushed toward the visible regime with the use of a textile-compatible ionic liquid with a larger electrochemical window.

Figure 8:
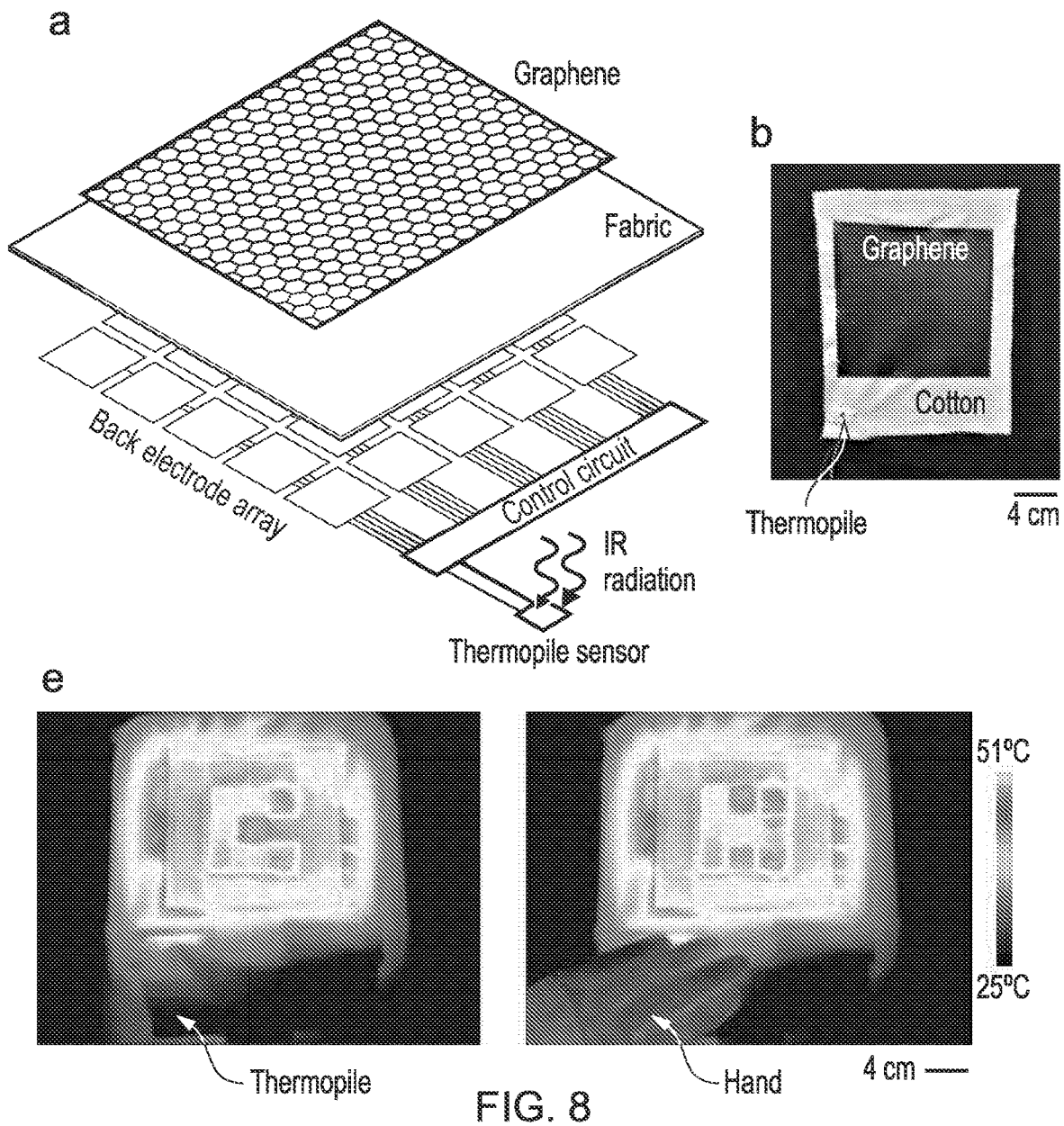
FIG. 8 shows the sensing and display capabilities of the devices of the invention. (a) Illustration of a textile device with sensing and display capabilities. (b) Photograph of the device with the attached thermopile sensor. (c) Variation of the output voltage of the sensor and (d) the apparent temperature of an active pixel as a hot object, inventor's hand, is brought over the sensor (t≈10 s) and removed (t≈22.5 s). The dashed lines mark the time when the sensor voltage reaches the pixel threshold voltage of 15 µV. (e) Thermal images of the textile device displaying letters "C" and "H" as a response to the absence and presence of the hand, respectively.
Figure 8:
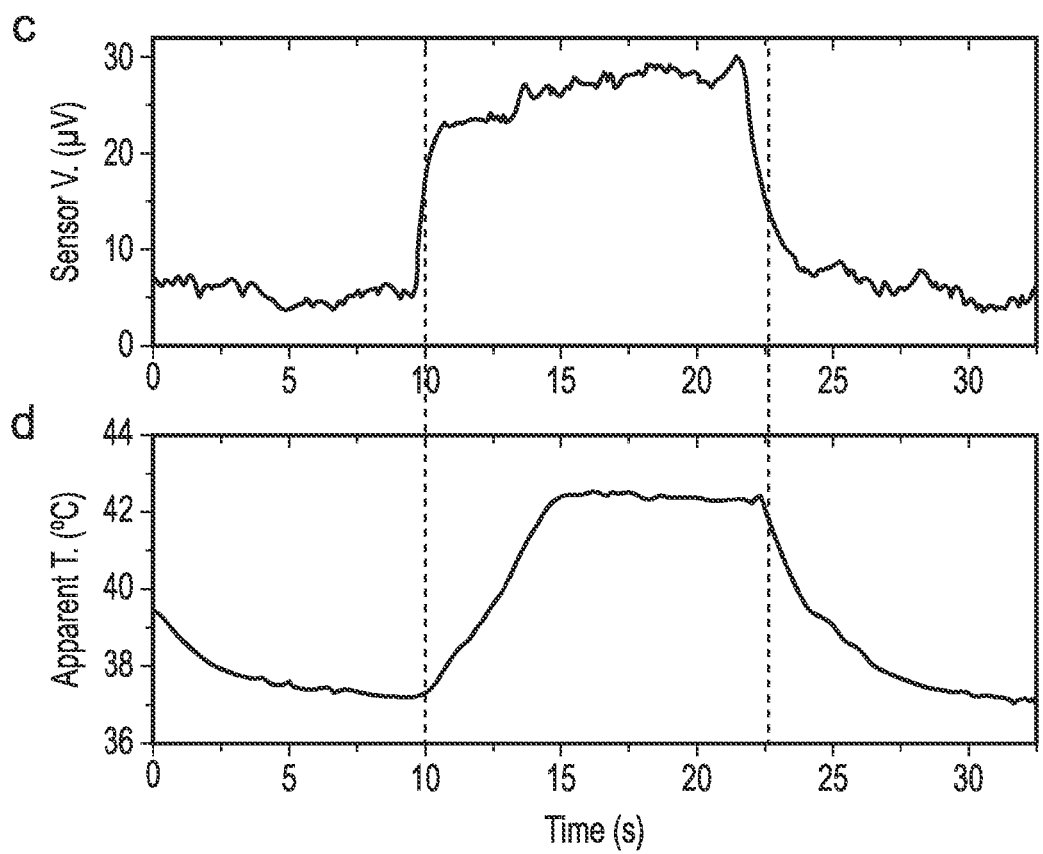
Figure 10:
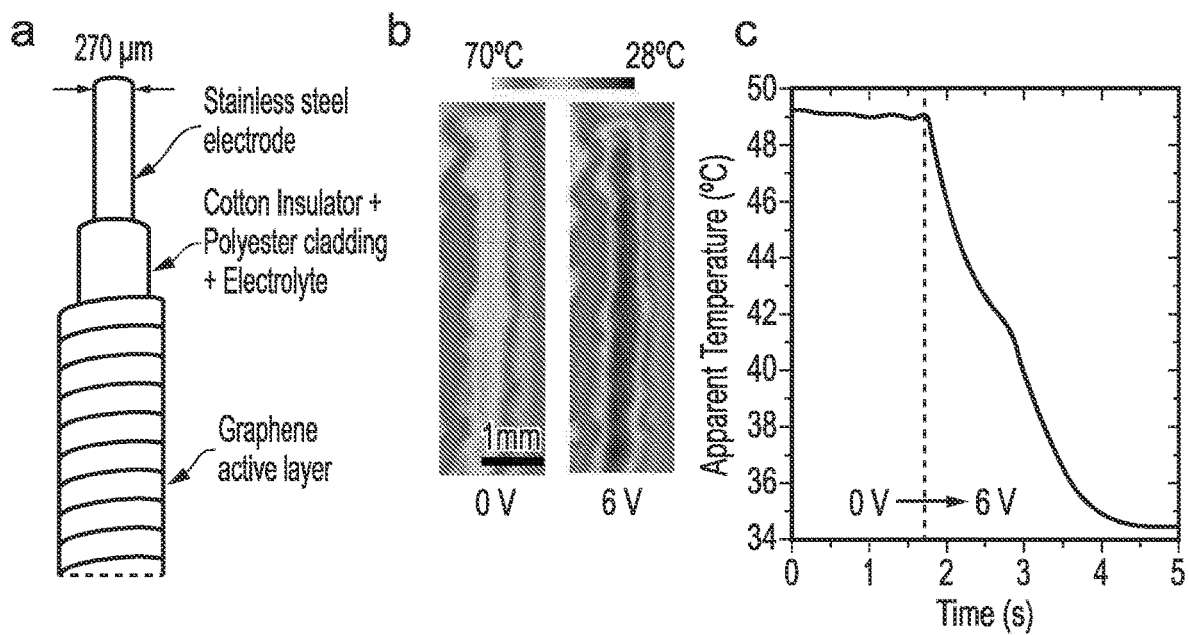
FIG. 10 shows yarn device of the present invention. (a) 3D illustration of the yarn device consisting of a stainless-steel wire core, a porous polyester cladding with cotton insulation, and MLG outer layer. (b) Thermal images of a yarn device showing the modulated IR emission. (c) The temporal change in the apparent temperature when turning it on (marked by the vertical line).

The electrically controlled emissivity of the textile devices together with the complex electrode patterns and embedded sensors can serve multiple functions such as adaptive thermal camouflage or textile display. FIG. 8 demonstrates such an example by combining the adaptive infrared response and display functions using a device with an array of 25 individually-addressable electrodes and a thermopile sensor (FIG. 8a). A large single-piece MLG sheet on cotton fabric was used as the active layer (FIG. 8b). Each electrode controls the emissivity of an area of 2×2 cm². An external electronic circuit was programmed to react to the heat signature on the sensor. The graphs in FIGS. 8c and 10d show the sensor signal and apparent temperature of an active pixel. The multipixel textile device shows letters "C" or "H" (representing cold and hot, respectively) by tuning the emissivity of corresponding pixels interacting to the absence or presence of a hot object over the sensor. FIG. 8e shows the thermal images during the operation of the device as it alternates between the two letters when a hand is placed over the radiation sensor. The inventors also tested graphene-based capacitive touch sensors and strain sensors on textiles which could provide more complex feedback from the surrounding of the device. The demonstration highlights the capability of creating complex adaptive patterns and sensing capabilities which would inspire other applications such as adaptively blending the thermal signature of the device into a dynamic background.

Figure 9:
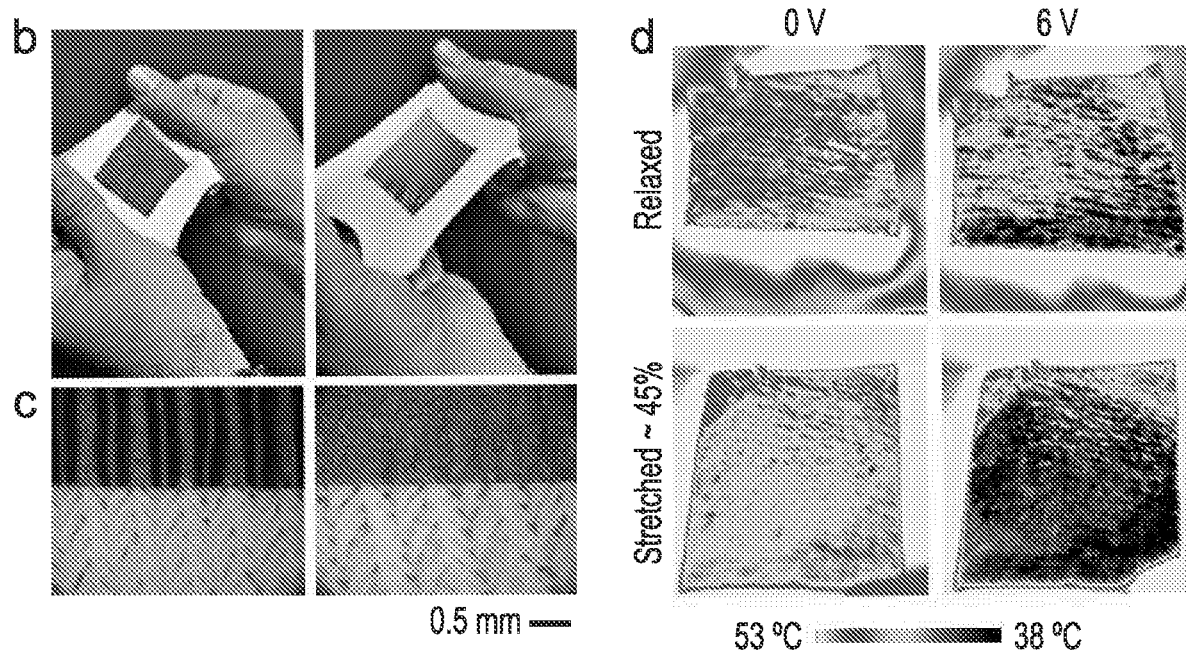
FIG. 9 shows the stretching properties of the device. (a) (i) a thin hot-melt adhesive layer was applied on the elastane fabric, (ii) MLG on PE sheet was laminated on the stretched fabric, (iii) after releasing the stress, the MLG/PE layer buckles and forms a wavy structure on the fabric. (b) Photographs and (c), microscope images of released and stretched device. The period of buckling is determined by the weaves of the fabric. (d) Thermal images of the device showing electrically controlled thermal emission at the stretched and relaxed states. (e) Variation of the emissivity (averaged between 8-13 µm) of the buckled graphene on elastane fabric as a function of strain. (f) Temporal response of the apparent temperature when applying voltage to the device (marked by the vertical line) for relaxed and stretched conditions.
Figure 9:
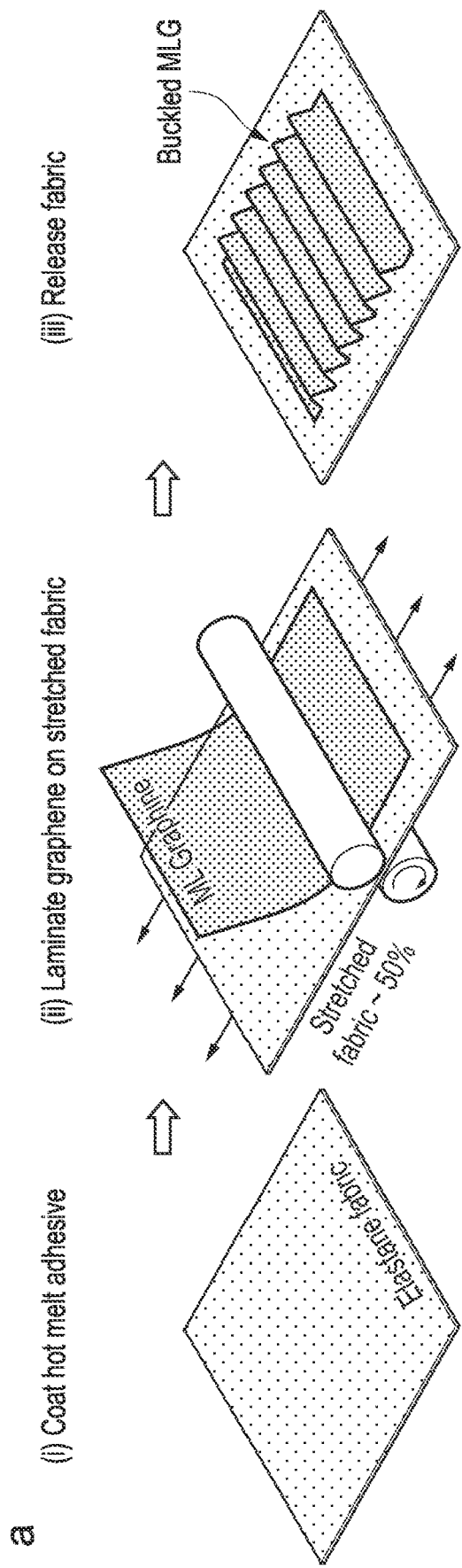
Figure 9:
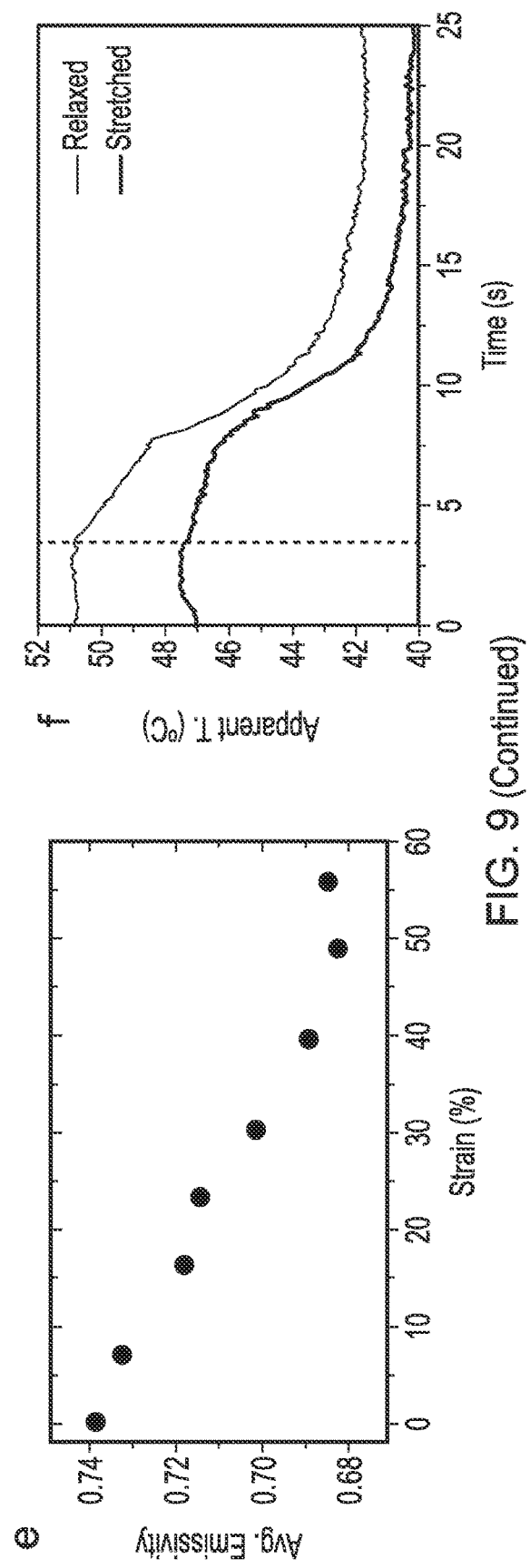

Stretchability is crucial to accommodate for the natural deformation and drapeability of textile in mechanically active environments. Although graphene itself can sustain strain higher than 20% (Young, R. J., Kinloch, I. A., Gong, L. & Novoselov, K. S. The mechanics of graphene nanocomposites: A review. *Composites Science and Technology* 72, 1459-1476, 2012), the CVD-grown polycrystalline multilayer graphene film is not stretchable due to the defects and grain boundaries. However, by structuring graphene layer into periodic, wavelike geometries on the textile surface can provide forms which can be stretched and compressed without damaging the graphene layer. The inventors designed a stretchable textile device using a highly stretchable elastane fabric and a stretchable conducting fabric as a back electrode. MLG on PE sheets were laminated on the fully stretched elastane knitted fabric (82% polyester, 18% elastane) as described in FIG. 9a. The MLG sheet is flat as fabricated and buckles when the fabric is relaxed, staying adhered to the fabric in both conditions (FIG. 9b-c). In this wavelike buckled geometry, the device can support over 60% strain compared to the non-strained condition. The modulation of the apparent temperature on the complete device is demonstrated for relaxed and stretched conditions (FIG. 9d). When the fabric is relaxed (zero strain) it exhibits higher emissivity (and absorptivity), hence higher apparent temperature, owing to enhanced light trapping by the buckled MLG (FIG. 9e-f). The effect of buckling on the optical properties is also visible in FIG. 9c.

The fabrication process may be scaled down to yarn level, in turn enabling a finer spatial resolution and as well as forming an active textile surface by interlacing, e.g., knitting, weaving. The device structure necessitates yarns with conductive cores coated with textile materials. Amongst the options available, yarns based on stainless steel wire and polyester cladding are chosen owing to the electrochemical stability of the stainless steel core and the uniformity of the polyester cladding. The conductive core and the cladding function as the back electrode and the separator/ionic-liquid-medium, respectively (FIG. 10a). A 270-µm-thick stainless steel wire is used for convenient handling of the yarns. Both the wire diameter and the cladding thickness can be scaled down for enhanced flexibility and ease of weaving. The yarns are covered with MLG using two methods: 1) Cutting MLG on PE sheets into narrow strips and winding them around the yarn, 2) Fishing MLG films by winding them around the yarns directly from the deionized water bath following the Ni-foil etching process. The first method provides a better coverage of the yarn surface, however, this is laborious as it involves preparing the strips and winding them around the yarn carefully. The second method takes advantage of MLG films formed in the water bath following Ni-foil etching owing to the lack of a polymer protection layer. This method, however, results in an uneven surface coverage and more importantly an unprotected MLG layer that is prone to mechanical wear. The devices were finished by applying ionic liquid to the polyester cladding. The overall process is suitable for automation using motorized stages and is a necessity for large-scale production and precise control of winding MLG. The yarn devices necessitate a higher voltage difference (6 V) to turn on owing to the voltage drop over the long graphene layer. (FIG. 10b, FIG. 10c). Both MLG covering methods show similar performances in terms of the modulation speed and range. Different from the 2D textile devices demonstrated above, the yarn devices emit infrared radiation in all radial directions owing to their cylindrical shape. This feature can be an advantage for creating textile devices observable from any angle. However, if the application requires observing only one side of the device, as in the case of clothing, the fabrication scheme needs to be reconsidered for higher energy efficiency and operation speed.

Figure 11:
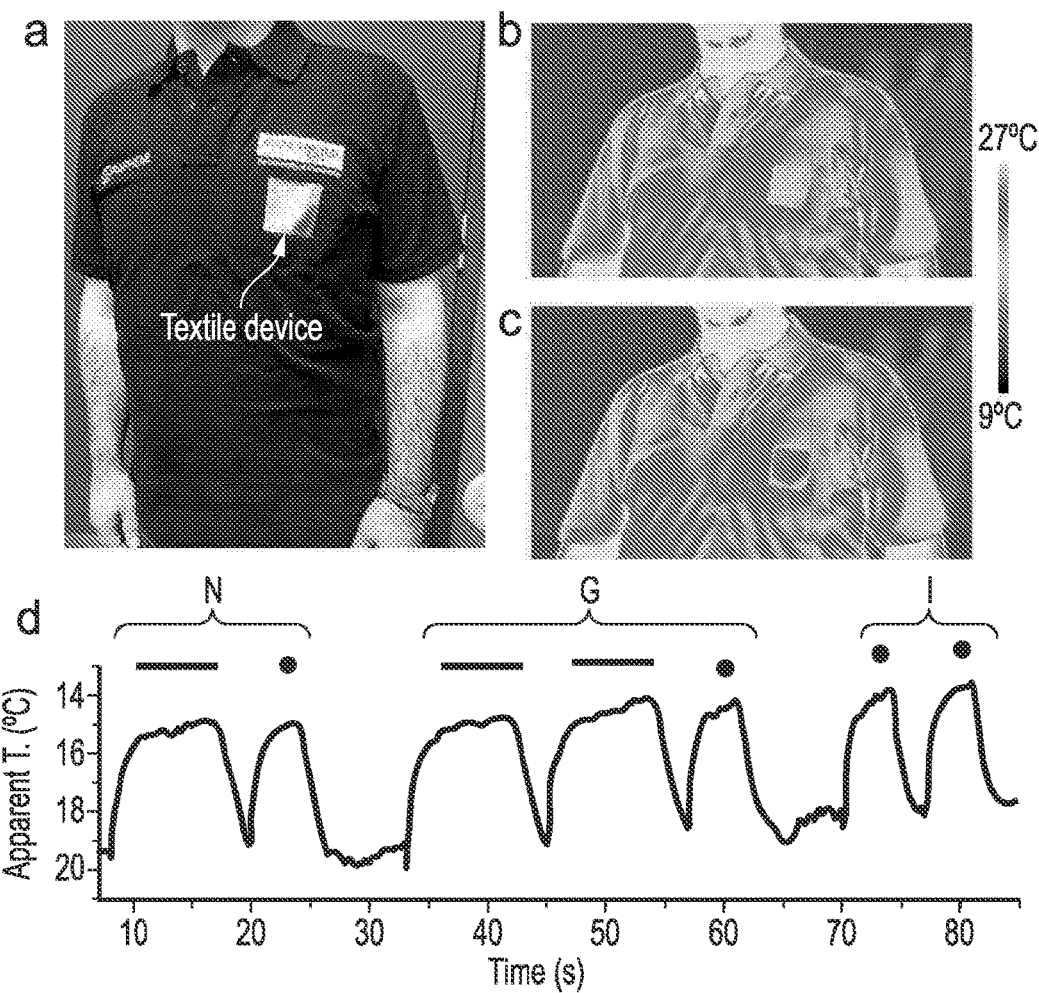

The inventors have also demonstrated long wavelength infrared (LWIR) communication on a t-shirt by electrically modulating the infrared radiation of the human body. Due to natural body temperature, in ambient conditions, the human body radiates ~100 W of infrared light mainly in the LWIR range. This spectral range also coincides with the atmospheric transmission window which enables long distance propagation of the emitted LWIR light. Without using an additional light source, the inventors were able to send messages undetectable by the naked eye or visible cameras by modulating the emissivity of a t-shirt. The t-shirt device was fabricated by laminating a 6×6 cm$^2$ PE/MLG film directly on a 100% cotton t-shirt surface and a stainless steel mesh to the back side (FIG. 11a). The inventors used a battery-powered microcontroller (Arduino UNO) to apply an encoded waveform generated by a pulse-width-modulated digital voltage that was programmed to communicate the initial letters of National Graphene Institute, "N", "G", and "I", in Morse code. The dash and dot signals were created by suppressing the apparent temperature for long (9 s) and short (3 s) durations. FIGS. 11b and 11c show the infrared snapshots of the t-shirt at the high and low emissivity states. The graph shows the recorded apparent temperature from a distance of 3 m. The experiment was conducted outdoors to take advantage of the lower background temperature.

This demonstration differs from the LWIR free-space optical communication that mainly aims transmitting data at high speed using high power infrared sources, e.g., quantum cascade lasers(Pavelchek, A., Trissel, R. G., Plante, J. & Umbrasas, S. Long-wave infrared (10-micron) free-space optical communication system. in *Free-Space Laser Communication and Active Laser Illumination III* (eds. Voelz, D. G. & Ricklin, J. C.) 5160, 247-252, SPIE, 2004). The main advantage of this is the use of the human body as a power source. Another advantage is that it prevents detection of the communicated message by the naked eye or visible cameras. The use of a microcontroller further allows building more sophisticated circuitry on textiles, in turn enabling more secure communication protocols, for instance initiation of the communication upon receiving an external triggering stimuli. The speed of communication using a single patch is limited by the intercalation/de-intercalation process which scales with the area of the device. Thus, the overall communication speed can be enhanced using multiple smaller patches and parallel processing of the message. Alternatively, a multipixel display, similar to the one employed in FIG. 8, can be used to communicate alphanumerical characters or complex patterns. The size of a patch or a pixel depends on the imaging distance and the resolution of the thermal camera. This demonstration emphasizes the natural adaptability of the developed technology to everyday apparel such as a t-shirt in a realistic environment, the use of body temperature for the operation, and the portability of the technology through the use of a small-scale and lightweight controller and power source.

Figure 12:
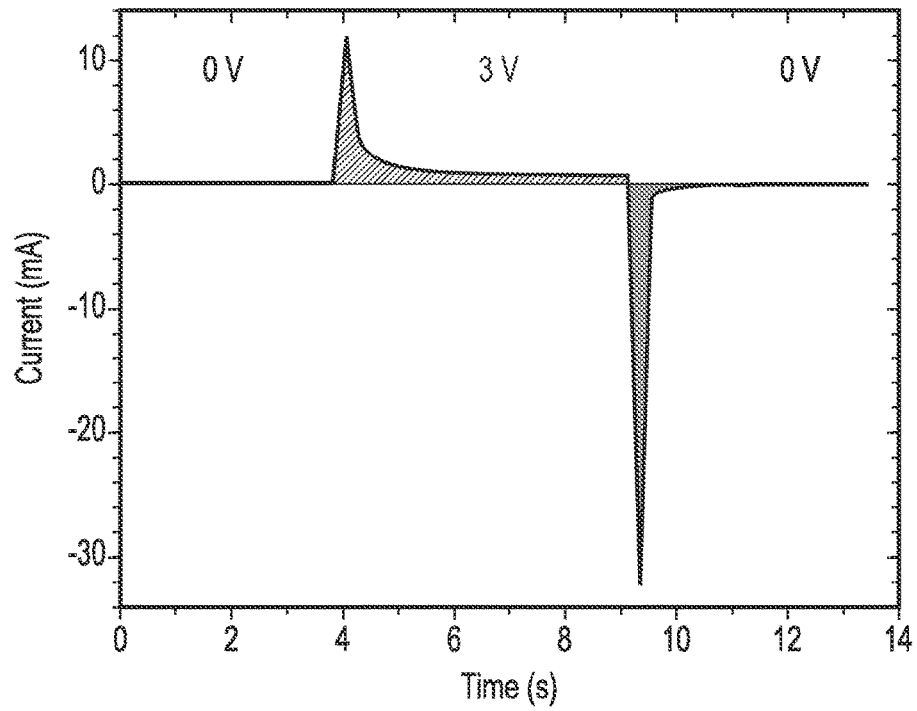
FIG. 12 shows the current-time characteristics of a 2×2 cm² sized device during intercalation (3 V) and de-intercalation (0 V).

The use of small electrical signals for modulation of the infrared emissivity is a significant advantage over the alternatives as it enables an adaptive response, a necessity for dynamic thermal camouflage and thermal management applications. The developed technology requires low voltage (~3 V) and low energy ($5.5 \times 10^{-4}$ mAh/cm$^2$ per intercalation event, corresponding to a charge density of ~$10^{14}$ cm$^{-2}$ for each graphene layer, see FIG. 12). Therefore, a compact coin cell with 1000 mAh capacity can turn on a t-shirt size (~1 m$^2$) device for ~180 times. Effectively operating as a capacitor, energy is consumed only during the charging (intercalation) cycle. Thus, the average standby power is virtually zero enabling hours or days of operation depending on the switching frequency. The low-voltage and low-power operation highly enhances the portability of the developed technology through the use of a miniature power supply and peripheral circuitry. In contrast, the alternative method (directly heating a surface) to control the thermal emission necessitates ~100 W for the same area. A coin cell battery can power such a device for only ~100 seconds.

Materials and Methods Multi-layer graphene (MLG) was synthesized on 25-µm-thick nickel foils (Alfa Aesar, 12722) by a chemical vapour deposition system (planarTECH CVD). First, a nickel substrate was heated to the growth temperature of 1050° C. under 100 sccm H$_2$, and 100 sccm Ar gases flow (quartz tube diameter 4"). Then, it was annealed at 1050° C. for 20 minutes to remove the native oxide layer. 35 sccm CH$_4$ flow at atmospheric pressure was used as the carbon precursor for 15 minutes. After the growth, the sample was cooled down to room temperature quickly under 100 sccm H$_2$ and 100 sccm Ar flow.

Figure 13:
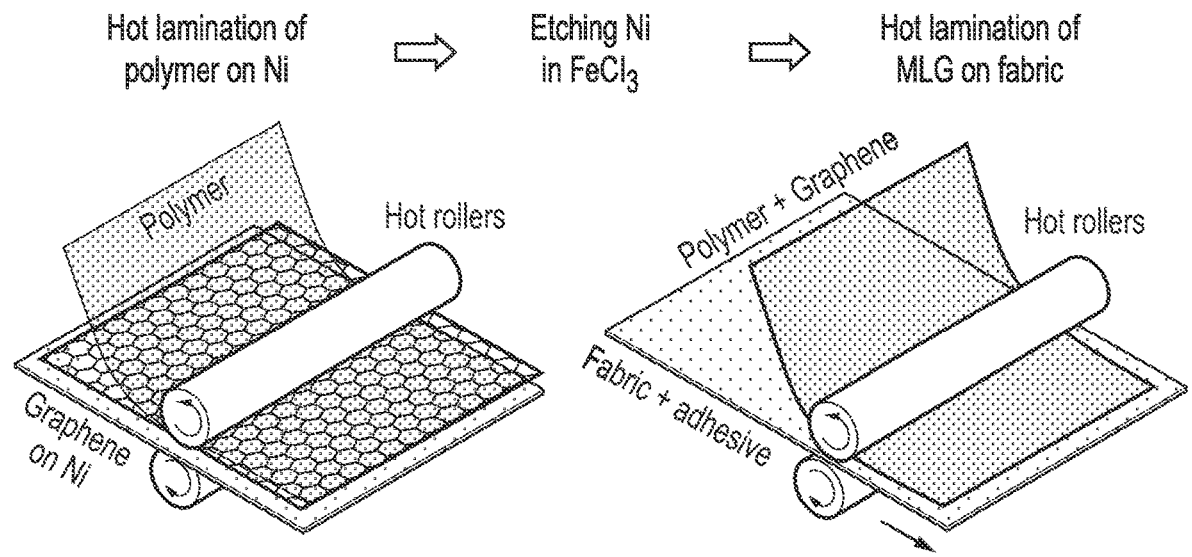
FIG. 13 shows an illustration of the process of producing MLG on PE laminated onto a fabric.
Figure 14:
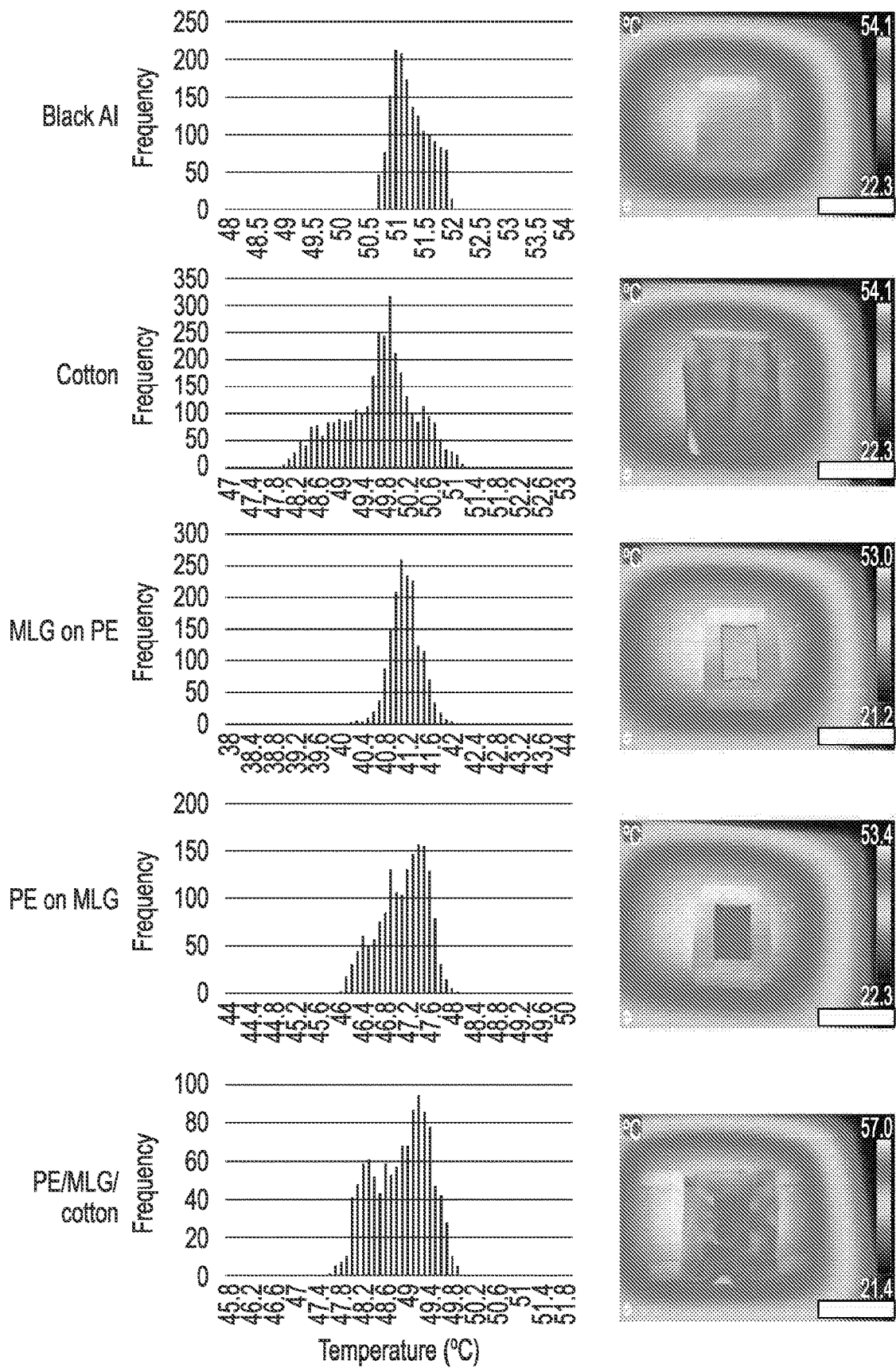
FIG. 14 shows apparent temperature histograms and thermographs of various samples placed on a hot plate at 55° C. Scale bars are 5 cm.

MLG on Ni foil was laminated at 160° C. on a 20-µm-thick polyethylene (PE) film that serves as a substrate for MLG during Ni foil etching and as well as an infrared-transparent protective layer once MLG was transferred on the fabric. FIG. 13 illustrates the transfer process. To produce MLG on PE sheet, the Ni foil was etched in 1M FeCl$_3$ solution in ~8 hours. The uniformity of MLG films transferred on PE and on fabric were characterized using high-resolution infrared imaging (FIG. 14). The apparent temperature distribution on each sample was used as a metric to quantify the uniformity of the infrared emissivity. MLG film on PE exhibits high uniformity similar to the performance of the black aluminium reference sample.

Fabrication of cotton-textile-based devices: The MLG film on PE was transferred onto the cotton fabric by applying an adhesive layer on the fabric and laminating the MLG on PE sheet on. The devices were completed by adhering a conductive fabric on the other side functioning as the back electrode. The conductive and the cotton fabrics were adhered together using a thin, fusible, iron-on interfacing material in between and applying heat to fuse the fabrics. Electrical wires were connected to the MLG and the conductive fabric for electrical biasing. Conductive fabric was silver plated knitted fabric (Technik-Tex P). The ionic liquid electrolyte used was BMIMPF$_6$(1-Butyl-3-methylimidazolium hexafluorophosphate, Sigma Aldrich 70956).

Fabrication of elastane-textile-based devices: Above procedure was followed with one additional step, where the elastane fabric was fully stretched while laminating MLG on a PE sheet.

Fabrication of yarn devices: Stainless steel soft wires (AISI 305, 0.27 mm) accompanied by insulating 100% cotton sheath yarns, (Ne 40) were uniformly covered by monofilament polyester at the twisting speed of 3000 twist/min (Agteks, DirectCover 2S). MLG was wrapped around polyester-cladded stainless-steel wires using two different methods: 1) MLG on PE sheets are created as described above and cut into narrow strips. Then the strips were wound around the yarn after applying ionic liquid electrolyte BMIMPF$_6$ to the polyester cladding. It is important to avoid overlapping the strips while wrapping the yarn to prevent unsuccessful intercalation at the edges, and 2) the PE lamination was omitted. This led to MLG forming films upon rinsing in a deionized water bath following Ni-foil etching. MLG films were then directly fished from the water by winding them around the yarn. Ionic liquid was applied around the MLG films.

Fabrication of electrode arrays on textile: 40-µm-thick negative dry film photoresist was coated on nonwoven high-density polyethylene textile by hot lamination. Electrode array patterns on a transparent plastic stencil were transferred to the photoresist using a large-area ultraviolet exposure unit delivering 40 mJ/cm². The photoresist was developed in $K_2CO_3$ solution (5% concentration) for 2 minutes. The samples were coated with 100 nm Au films in a sputtering chamber (sputtering current: 20 mA, deposition rate: 13 nm/min). Finally, the remaining photoresist was lifted off leaving the desired patterns on the textile.

Characterisation

Figure 15:
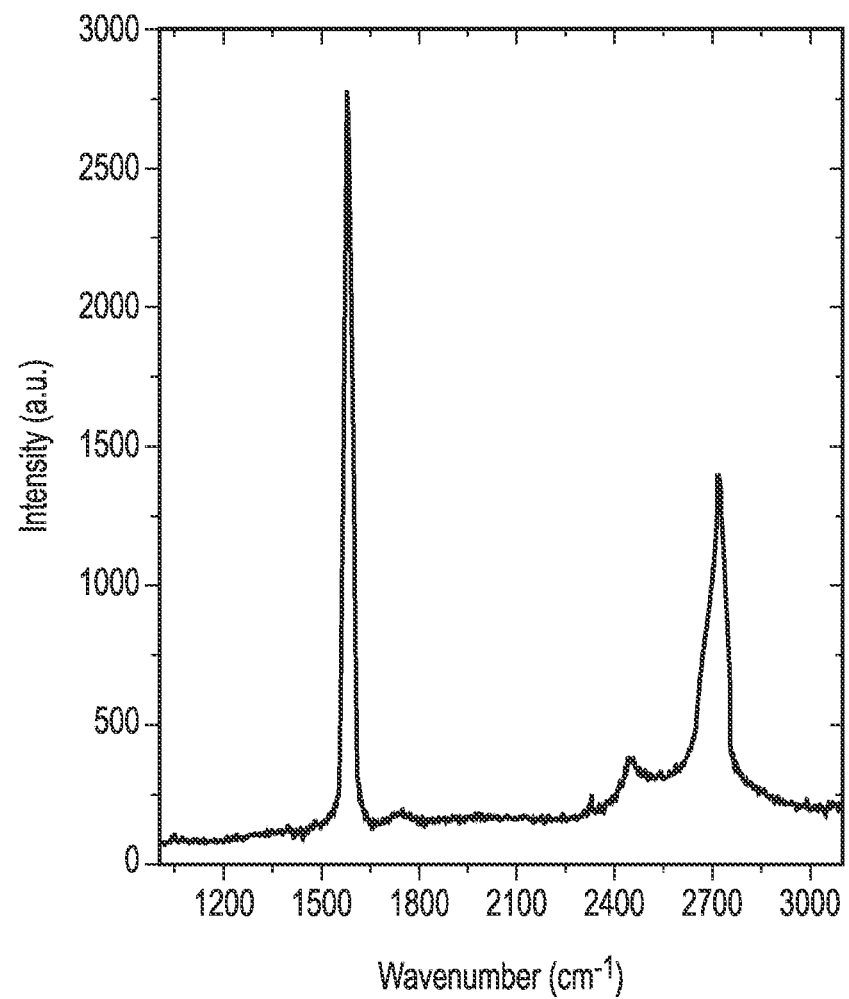
FIG. 15 shows a Raman spectrum of MLG on Ni foil. The higher intensity of the G band at 1581 cm$^{-1}$ compared to the 2D band at 2718 cm$^{-1}$ reveals the multilayer nature of the material.
Figure 16:
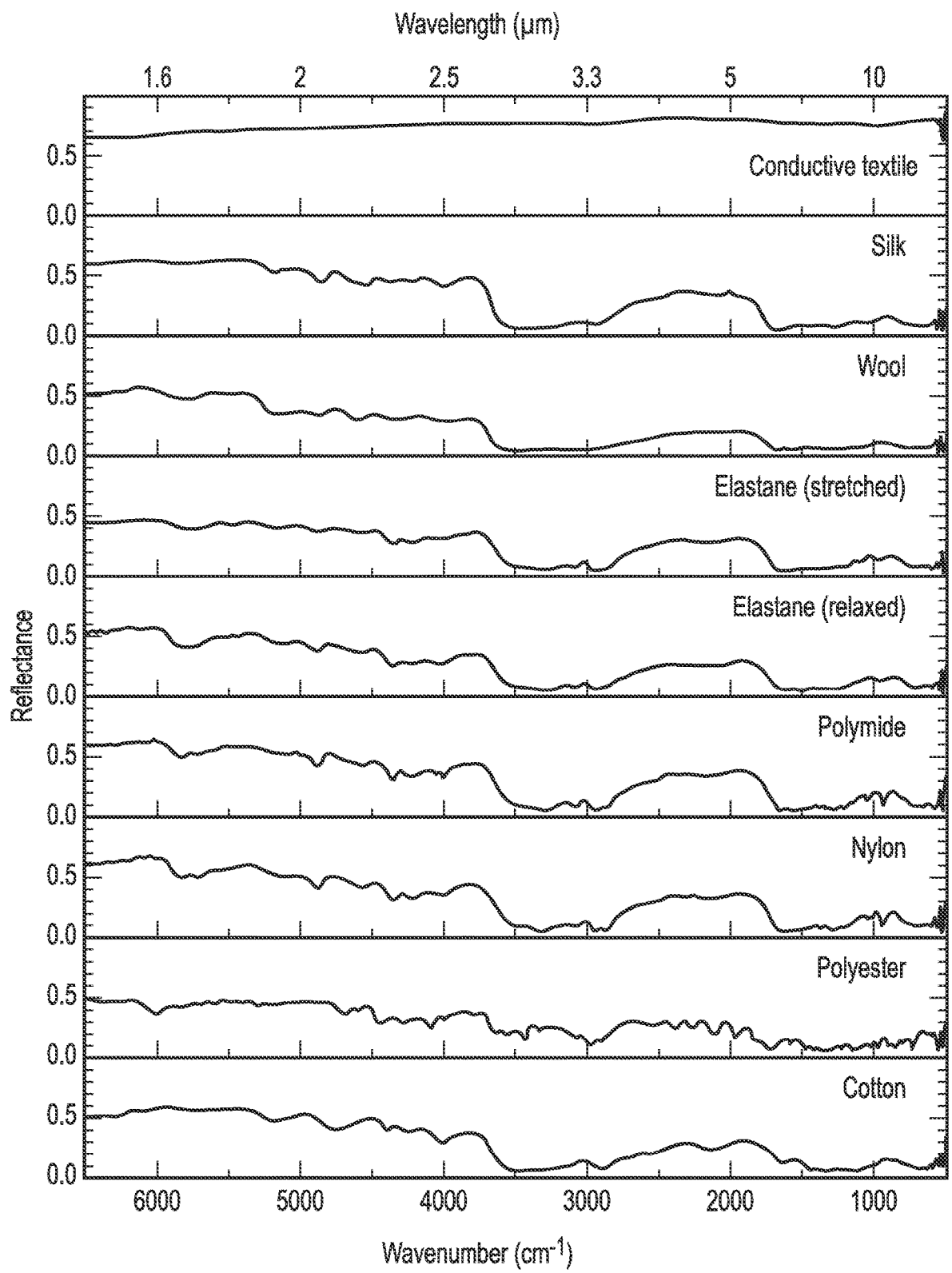
FIG. 16 shows infrared reflection spectra of common textile materials.
Figure 17:
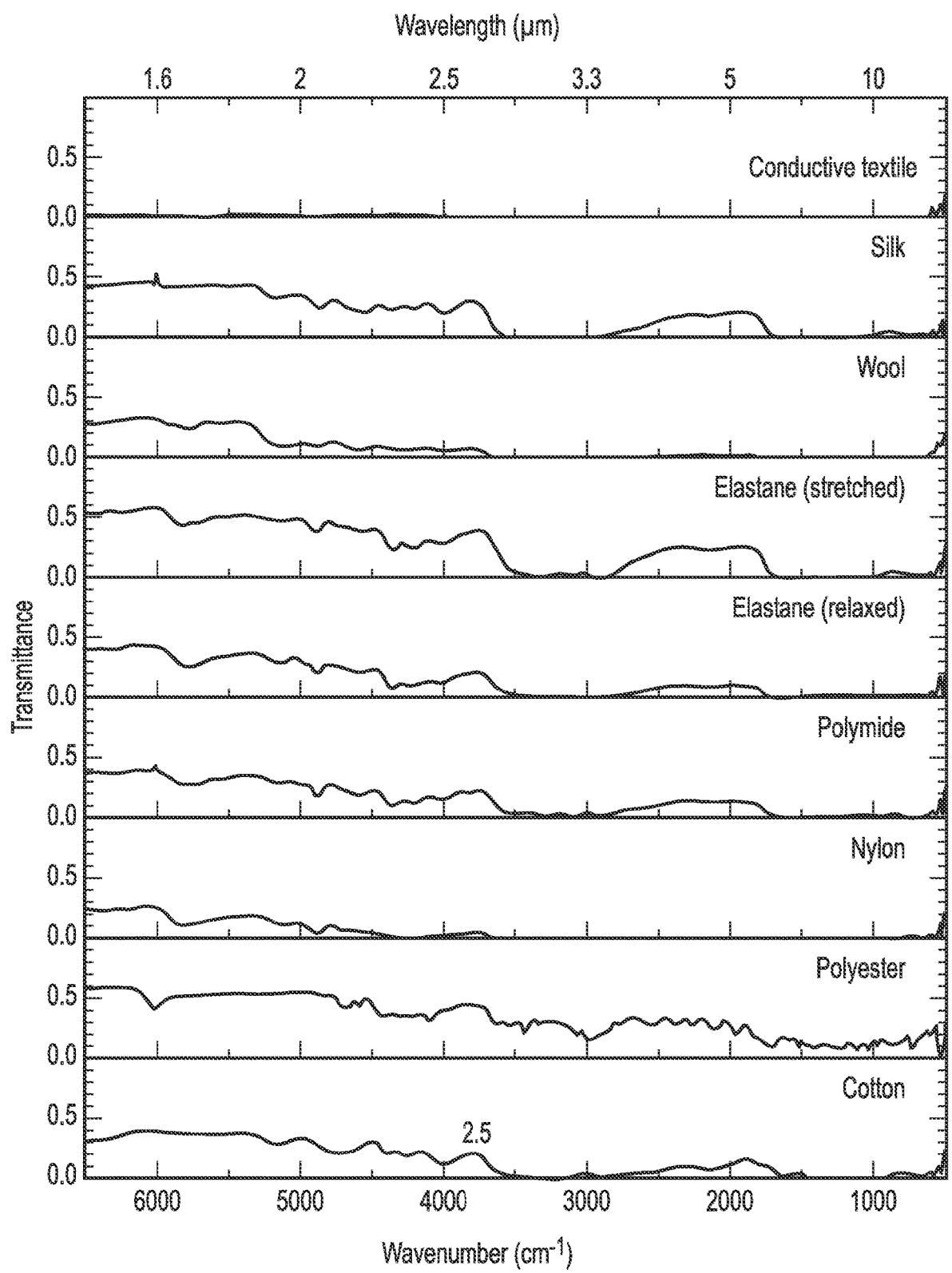
FIG. 17 shows infrared transmission spectra of common textile materials.
Figure 18:
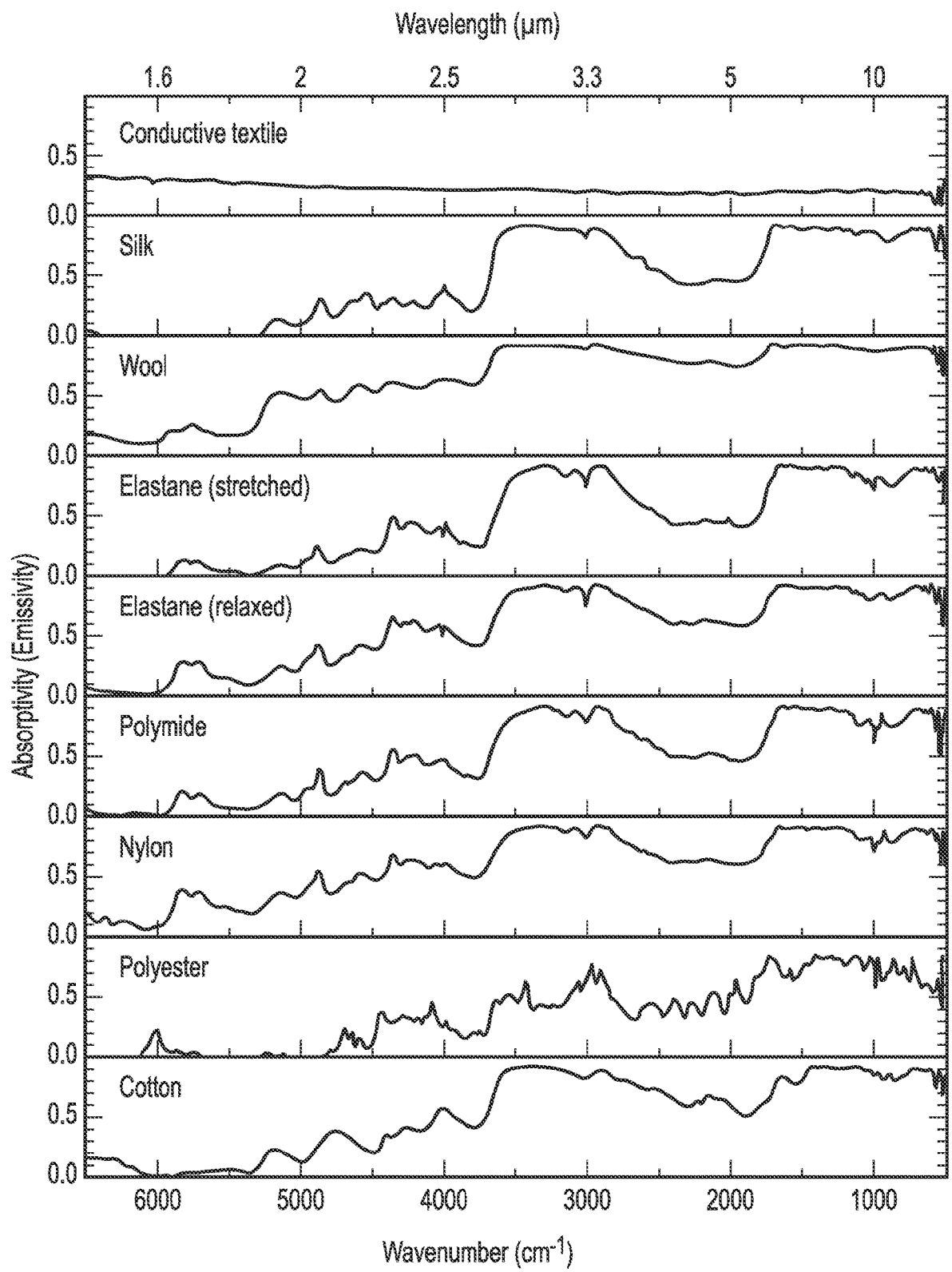
FIG. 18 shows infrared emissivity spectra of common textile materials.

The material characterization of MLG was performed using Raman spectroscopy (532 nm laser, 2 s exposure and 3 accumulation) prior to the transfer process (FIG. 15). The voltage difference on a complete device was controlled by a source meter while monitoring the device current. The back electrode was electrically grounded while applying a positive voltage on the MLG for intercalation of ions. De-intercalation was achieved by either applying 0 V or a slightly negative voltage (−1 V) to the MLG. FTIR measurements were performed using a Perkin Elmer Spectrum 100 FTIR spectrometer equipped with an integrating sphere and a liquid nitrogen cooled mercury-cadmium-telluride detector at a spectral resolution of 4 cm$^{-1}$. The reflection (R) results were used to evaluate the emissivity spectra ($\varepsilon$=1−R). FIG. 16, FIG. 17, and FIG. 18 show infrared reflection (R), transmission (T), and emissivity (ε) spectra of common textile materials. Emissivity for these materials was calculated as 1−R−T. Thermal images and videos were recorded by a FLIR thermal camera (FLIR T660). The near infrared measurements were performed using another integrating sphere and a visible/NIR spectrometer. The NIR images were taken using a CCD camera without a NIR cut-off filter. A long-pass optical filter (cut-on wavelength=700 nm) was used to capture only the near-infrared response of the devices.

Mechanical Testing

An MLG on PE sheet with dimensions of 10×4 cm² was transferred on a cotton fabric. The sheet resistance of MLG was continuously measured as the sample was repeatedly bent and compressed with a tensile tester to monitor the mechanical durability. The electrical resistance of MLG was recorded with a National Instrument 9219 data acquisition card (NI, American) and was used to track the mechanical quality of the sample.

The invention claimed is:

1. A device for controlling the emissivity of a surface, the device comprising:
   an active layer comprising from 5 to 500 atomic layers of graphene, said active layer having a first surface and a second surface;
   a substrate that comprises fibres and, absorbed into the fibres of the substrate, an ionic liquid or a liquid electrolyte, said substrate having a first surface and a second surface;
   wherein said second surface of the active layer is in contact with the first surface of the substrate;
   a conductor that is in contact with the second surface of the substrate; and
   a means for applying a controllably variable electrical potential between the conductor and the active layer, wherein the substrate is selected from: cotton, silk, wool, polyester, polyethylene, nylon, woven cotton, and non-woven polyethylene.

2. The device of claim 1, wherein the device further comprises a protective layer in contact with the first surface of the active layer.

3. The device of claim 2, wherein the protective layer is polyethylene, optionally wherein the protective layer is low density polyethylene.

4. The device of claim 1, wherein the active layer comprises from 50 to 500 atomic layers of graphene.

5. The device of claim 1, wherein the device is a planar device.

6. The device of claim 1, wherein the substrate is a textile.

7. The device of claim 1, wherein the device comprises an adhesive between the active layer and the substrate.

8. The device of claim 1, wherein the substrate comprises an ionic liquid, optionally an ionic liquid selected from:
   [DEME][TFSI] (Diethylmethyl(2-methoxyethyl)ammonium bis(trifluoromethylsulfonyl)imide), 1,3-dimethylimidazolium methyl-phosphonate, 1-(4-sulfobutyl)-3-methylimidazolium bis(trifluoromethanesulfonyl)imide, 1-(4-sulfobutyl)-3-methylimidazolium hydrogen sulfate, 1-(4-sulfobutyl)-3-methylimidazolium trifluoromethanesulfonate 1-Butyl-1-Methylpyrrolidinium bis(oxalate)borate, 1-Butyl-1-Methylpyrrolidinium Dicyanamide, 1-Butyl-1-methylpyrrolidinium trifluoromethanesulfonate, 1-Butyl-3-methylimidazolium iodide, 1-Ethyl-3-Methylimidazolium Dicyanamide, 1-Ethyl-3-methylimidazolium diethyl phosphate, 1-Ethyl-3-methylimidazolium methyl-phosphonate, 1-Ethyl-3-methylimidazolium trifluoromethanesulfonate, 1-Ethyl-3-methylimidazolium trifluoromethanesulfonate, 1-Hexyl-3-methylimidazolium trifluoromethanesulfonate, 3-Methyl-1-propylimidazolium iodide, N-Tributyl-N-methylammonium iodide, N-Trimethyl-N-butylammonium bromide, BMIMPF$_6$ (1-Butyl-3-methylimidazolium hexafluorophosphate), (N,N-diethyl-N-methyl-N(2methoxyethyl)ammonium bis(fluorosulfonyl)imide, (N,N-diethyl-N-methyl-N(2methoxyethyl)ammonium bis(trifluoromethanesulfonyl)imide, 1-Allyl-3H-imidazolium bis(trifluoromethanesulfonyl)imide, 1-Butyl-1-methylpyrrolidinium bis(fluorosulfonyl)imide, 1-Butyl-1-methylpyrrolidinium bis(fluorosulfonyl)imide, 1-Butyl-1-methylpyrrolidinium bis(trifluoromethanesulfonyl)imide, 1-Butyl-1-methylpyrrolidinium bis(trifluoromethanesulfonyl)imide, 1-Butyl-3-methylimidazolium bis(trifluoromethanesulfonyl)imide, 1-Butyl-3-methylimidazolium bis(trifluoromethanesulfonyl)imide, 1-Ethyl-3-methylimidazolium bis(fluorosulfonyl)imide, 1-Ethyl-3-methylimidazolium bis(fluorosulfonyl)imide, 1-Ethyl-3-methylimidazolium bis(trifluoromethanesulfonyl)imide, 1-Ethyl-3-methylimidazolium bis(trifluoromethanesulfonyl)imide, 1-Ethyl-3-methylimidazolium bis(trifluoromethanesulfonyl)imide, 1-Hexyl-3-methylimidazolium bis(trifluoromethanesulfonyl)imide, 1-Hexyl-3-methylimidazolium bis(trifluoromethanesulfonyl)imide, 1-Methyl-1-(2-methoxyethyl)pyrrolidinium bis(fluorosulfonyl)imide, 1-Methyl-1-(2-methoxyethyl)pyrrolidinium bis(trifluoromethanesulfonyl)imide, 1-Methyl-1-(3-methoxypropyl)pyrrolidinium bis(fluorosulfonyl)imide, 1-Methyl-1-(3-methoxypropyl)pyrrolidinium bis(trifluoromethanesulfonyl)imide, 1-Methyl-1-octylpyrrolidinium bis(trifluoromethanesulfonyl)imide, 1-Methyl-1-octylpyrrolidinium bis(trifluoromethanesulfonyl)imide, 1-Methyl-1-pentylpyrrolidinium bis(trifluoromethanesulfonyl)imide, 1-Octyl-3-methylimidazolium bis(trifluoromethanesulfonyl)imide, H-3-methylimidazolium bis(trifluoromethanesulfonyl)

imide, N,N-Diethyl-N-methyl-N-propylammonium bis(fluorosulfonyl)imide, N,N-Diethyl-N-methyl-N-propylammonium bis(fluorosulfonyl)imide, N,N-dimethyl-N-ethyl-N-(3-methoxypropyl)ammonium bis(fluorosulfonyl)imide, N,N-dimethyl-N-ethyl-N-(3-methoxypropyl)ammonium bis(trifluoromethanesulfonyl)imide, N,N-Dimethyl-N-ethyl-N-benzylAmmonium bis(trifluoromethanesulfonyl)imide, N,N-Dimethyl-N-Ethyl-N-Phenylethylammonium bis(trifluoromethanesulfonyl)imide, N-butyl-N-methylpiperidinium bis(trifluoromethanesulfonyl)imide, N-butyl-N-methylpiperidinium bis(trifluoromethanesulfonyl)imide, N-Ethyl-N,N-dimethyl-N-(2-methoxyethyl)ammonium bis(fluorosulfonyl)imide, N-Ethyl-N,N-dimethyl-N-(2-methoxyethyl)ammonium bis(trifluoromethanesulfonyl)imide, N-propyl-N-methylpiperidinium bis(fluorosulfonyl)imide, N-propyl-N-methylpiperidinium bis(fluorosulfonyl)imide, N-propyl-N-methylpiperidinium bis(trifluoromethanesulfonyl)imide, N-propyl-N-methylpiperidinium bis(trifluoromethanesulfonyl)imide, N-Propyl-N-methylpyrrolidinium bis(fluorosulfonyl)imide, N-Propyl-N-methylpyrrolidinium bis(fluorosulfonyl)imide, N-Propyl-N-methylpyrrolidinium bis(trifluoromethanesulfonyl)imide, N-Propyl-N-methylpyrrolidinium bis(trifluoromethanesulfonyl)imide, N-Tributyl-N-methylammonium bis(trifluoromethanesulfonyl)imide, N-Tributyl-N-methylammonium dicyanamide, N-Tributyl-N-methylammonium bis(trifluoromethanesulfonyl)imide, N-Trimethyl-N-butylammonium bis(fluorosulfonyl)imide, N-Trimethyl-N-butylammonium bis(fluorosulfonyl)imide, N-Trimethyl-N-butylammonium bis(trifluoromethanesulfonyl)imide, N-Trimethyl-N-butylammonium bis(trifluoromethanesulfonyl)imide, N-Trimethyl-N-hexylammonium bis(trifluoromethanesulfonyl)imide, N-Trimethyl-N-hexylammonium bis(trifluoromethanesulfonyl)imide, N-Trimethyl-N-propylammonium bis(fluorosulfonyl)imide, N-Trimethyl-N-propylammonium bis(fluorosulfonyl)imide, N-Trimethyl-N-propylammonium bis(trifluoromethanesulfonyl)imide, N-Trimethyl-N-propylammonium bis(trifluoromethanesulfonyl)imide and Trihexyl(tetradecyl)phosphonium chloride.

9. The device of claim 1, wherein the conductor is selected from: silver, stainless steel, gold, graphene, and reduced graphene oxide.

10. The device of claim 1, wherein the conductor is porous.

11. The device of claim 1, wherein the conductor is in contact with substantially all of the portions of the second surface of the substrate that correspond to the portions of the first surface of the substrate that are in contact with the active layer.

12. The device of claim 1, wherein the conductor is a conductive layer.

13. The device of claim 12, wherein the conductive layer comprises a plurality of single conductive patches that are electrically isolated from one another.

14. The device of claim 13, wherein the means for applying a controllably variable electrical potential is a means for applying a controllably variable electrical potential independently between each of the plurality of single conductive patches of the conductor and the active layer.

15. A method of varying the emissivity of a first surface of an active layer of a device for controlling the emissivity of a surface, the device comprising an active layer comprising from 5 to 500 atomic layers of graphene, said active layer having a first surface and a second surface; a substrate that comprises fibres and, absorbed into the fibres of the substrate, an ionic liquid or a liquid electrolyte, said substrate having a first surface and a second surface; wherein said second surface of the active layer is in contact with the first surface of the substrate; a conductor that is in contact with the second surface of the substrate; and a means for applying a controllably variable electrical potential between the conductor and the active layer, the method comprising varying the electrical potential that is applied between the conductive layer and the active layer, wherein the substrate is selected from: cotton, silk, wool, polyester, polyethylene, nylon, woven cotton, and non-woven polyethylene.

16. The method of claim 15, wherein the emissivity that is being controlled is the emissivity of the surface in the infra-red range.

17. The method of claim 15, wherein the electrical potential is varied between −10 and 10 V.

18. A method of making a device for controlling the emissivity of a surface, the device comprising an active layer comprising from 5 to 500 atomic layers of graphene, said active layer having a first surface and a second surface; a substrate that comprises fibres and, absorbed into the fibres of the substrate, an ionic liquid or a liquid electrolyte, said substrate having a first surface and a second surface; wherein said second surface of the active layer is in contact with the first surface of the substrate; a conductor that is in contact with the second surface of the substrate; and a means for applying a controllably variable electrical potential between the conductor and the active layer, the method comprising:

(i) affixing the second surface of the active layer with the first surface of the substrate;

(ii) affixing the conductor to the second surface with the substrate; and (iii) diffusing ionic liquid into the substrate, wherein the substrate is selected from: cotton, silk, wool, polyester, polyethylene, nylon, woven cotton, and non-woven polyethylene.

19. The method of claim 18, wherein (iii) further comprises applying the ionic liquid to the conductor and allowing the ionic liquid to diffuse into the substrate.

20. The method of claim 18, wherein (i) further comprises applying an adhesive onto the first surface of the substrate and then contacting the second surface of the active layer with the first surface of the substrate.

21. The method of claim 18, wherein (i) further comprises treatment of the first surface of the substrate layer and then contacting the second surface of the active layer with the first surface of the substrate.

* * * * *